US012706381B2

(12) United States Patent
Koyama et al.

(10) Patent No.: US 12,706,381 B2
(45) Date of Patent: Aug. 11, 2026

(54) ANTENNA APPARATUS, COMMUNICATION APPARATUS, AND IMAGE CAPTURING SYSTEM

(71) Applicant: CANON KABUSHIKI KAISHA, Tokyo (JP)

(72) Inventors: Yasushi Koyama, Kanagawa (JP); Takeaki Itsuji, Kanagawa (JP); Yuki Kitazawa, Kanagawa (JP); Tatsuya Murao, Kanagawa (JP); Koji Yukimasa, Kanagawa (JP); Takahiro Sato, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 456 days.

(21) Appl. No.: 18/299,917

(22) Filed: Apr. 13, 2023

(65) Prior Publication Data

US 2023/0335898 A1 Oct. 19, 2023

(30) Foreign Application Priority Data

Apr. 15, 2022 (JP) ................................ 2022-067821

(51) Int. Cl.
*H01Q 3/36* (2006.01)

(52) U.S. Cl.
CPC .................................... *H01Q 3/36* (2013.01)

(58) Field of Classification Search
CPC ...... H01Q 3/36; H01Q 21/065; H01Q 1/2283; H01Q 23/00
See application file for complete search history.

(56) References Cited

U.S. PATENT DOCUMENTS

| | | | |
|---|---|---|---|
| 6,456,215 | B1 | 9/2002 | Frazier |
| 7,248,995 | B2 | 7/2007 | Itsuji |
| 7,358,918 | B2 | 4/2008 | Itsuji |
| 7,542,000 | B2 | 6/2009 | Itsuji |
| 7,560,695 | B2 | 7/2009 | Kasai |
| 7,570,216 | B2 | 8/2009 | Itsuji |
| 7,633,299 | B2 | 12/2009 | Itsuji |

(Continued)

FOREIGN PATENT DOCUMENTS

| | | | |
|---|---|---|---|
| CN | 114270701 | A | 4/2022 |
| EP | 4203027 | A1 | 6/2023 |

(Continued)

OTHER PUBLICATIONS

Korean Office Action issued Jun. 14, 2025 during prosecution of related Korean patent application No. 10-2023-0045760. (English translation included).

(Continued)

*Primary Examiner* — Seokjin Kim
(74) *Attorney, Agent, or Firm* — VENABLE LLP

(57) ABSTRACT

An antenna apparatus that comprises an antenna array in which a plurality of active antennas each including an antenna and a semiconductor structure configured to generate or detect an electromagnetic wave are arranged in an array, a coupling line configured to mutually couple two antennas respectively included in at least two active antennas among the plurality of active antennas, and an impedance variable device configured to make an impedance of the coupling line variable is provided.

26 Claims, 15 Drawing Sheets

(56) References Cited

U.S. PATENT DOCUMENTS

| | | | | | |
|---|---|---|---|---|---|
| 7,745,791 | B2 | | 6/2010 | Kasai | |
| 7,884,767 | B2 | | 2/2011 | Itsuji | |
| 7,919,752 | B2 | | 4/2011 | Itsuji | |
| 7,922,659 | B2 | | 4/2011 | Itsuji | |
| 7,924,107 | B2 | | 4/2011 | Koyama | |
| 8,003,961 | B2 | | 8/2011 | Itsuji | |
| 8,129,683 | B2 | | 3/2012 | Itsuji | |
| 8,207,501 | B2 | | 6/2012 | Katagiri | |
| 8,344,324 | B2 | | 1/2013 | Kasai | |
| 8,451,069 | B2 | | 5/2013 | Sekiguchi | |
| 8,618,486 | B2 | | 12/2013 | Itsuji | |
| 8,686,916 | B2 | | 4/2014 | Yukimasa | |
| 9,184,697 | B2 | | 11/2015 | Sekiguchi | |
| 9,391,428 | B2 | | 7/2016 | Koyama | |
| 9,680,000 | B2 | | 6/2017 | Jang et al. | |
| 9,825,369 | B2 | | 11/2017 | Takasaki | |
| 9,899,959 | B2 | | 2/2018 | Feiginov | |
| 10,897,073 | B2 | | 1/2021 | Sato | |
| 11,300,602 | B1 | | 4/2022 | Kuppuswamy | |
| 11,442,338 | B2 | | 9/2022 | Itsuji | |
| 11,515,625 | B2 | * | 11/2022 | Driscoll | H01Q 3/24 |
| 11,616,918 | B2 | | 3/2023 | Sato | |
| 11,626,839 | B2 | | 4/2023 | Koyama | |
| 11,831,063 | B2 | | 11/2023 | Koyama | |
| 2002/0093396 | A1 | | 7/2002 | Smith | |
| 2005/0285541 | A1 | | 12/2005 | Lechevalier | |
| 2007/0279136 | A1 | * | 12/2007 | Koyama | H03B 5/1847<br>331/107 T |
| 2010/0295729 | A1 | | 11/2010 | Nogami | |
| 2014/0266477 | A1 | | 9/2014 | Sekiguchi | |
| 2017/0155361 | A1 | * | 6/2017 | Suzuki | H10D 1/64 |
| 2017/0170785 | A1 | * | 6/2017 | Tousi | H01Q 3/36 |
| 2020/0067170 | A1 | | 2/2020 | Sato | |
| 2020/0111929 | A1 | * | 4/2020 | Koyama | H10F 30/21 |
| 2020/0243458 | A1 | | 7/2020 | Yoshioka | |
| 2020/0266762 | A1 | * | 8/2020 | Kandori | H01Q 23/00 |
| 2021/0041293 | A1 | * | 2/2021 | Ramisetti | G01N 21/3581 |
| 2021/0067094 | A1 | * | 3/2021 | Kandori | H03B 5/129 |
| 2021/0067095 | A1 | * | 3/2021 | Kandori | H03B 7/143 |
| 2021/0091722 | A1 | * | 3/2021 | Koyama | H01Q 9/0457 |
| 2021/0410100 | A1 | | 12/2021 | Balasubramanian | |
| 2022/0057519 | A1 | | 2/2022 | Goldstein | |
| 2022/0114769 | A1 | | 4/2022 | Omori | |
| 2022/0173515 | A1 | * | 6/2022 | Koyama | H03B 5/1212 |
| 2022/0416382 | A1 | * | 12/2022 | Woods, Jr. | H01Q 3/36 |
| 2023/0155292 | A1 | | 5/2023 | Koyama | |
| 2023/0163801 | A1 | | 5/2023 | Wiegner | |
| 2023/0251368 | A1 | * | 8/2023 | Rogers | G01S 13/426 |
| 2023/0282970 | A1 | * | 9/2023 | Koyama | H03B 7/146<br>343/824 |
| 2023/0284907 | A1 | | 9/2023 | Wang | |
| 2023/0335885 | A1 | * | 10/2023 | Yukimasa | H03B 7/08 |
| 2023/0378637 | A1 | | 11/2023 | Goden | |

FOREIGN PATENT DOCUMENTS

| | | | | | |
|---|---|---|---|---|---|
| GB | 2613891 | A | * | 6/2023 | H04B 7/0617 |
| JP | H05-067919 | A | | 3/1993 | |
| JP | 2006-304006 | A | | 11/2006 | |
| JP | 2014-200065 | A | | 10/2014 | |
| JP | 2016-119647 | A | | 6/2016 | |
| JP | 63-73010 | B2 | | 8/2018 | |
| JP | 2020-36311 | A | | 3/2020 | |
| JP | 2020-125927 | A | | 8/2020 | |
| JP | 2020-141228 | A | | 9/2020 | |
| JP | 2021-34908 | A | | 3/2021 | |
| JP | 2021-52276 | A | | 4/2021 | |
| JP | 2021-63781 | A | | 4/2021 | |
| JP | 2022-23418 | A | | 2/2022 | |
| JP | 2022070824 | A | * | 5/2022 | |
| JP | 2023157733 | A | * | 10/2023 | H01Q 3/36 |
| JP | 2023157734 | A | * | 10/2023 | H03B 7/08 |
| JP | 2023157735 | A | * | 10/2023 | H04B 7/0617 |
| JP | 2023157736 | A | * | 10/2023 | H01Q 1/2283 |
| JP | 2023157737 | A | * | 10/2023 | H01Q 1/24 |
| KR | 10-2016-0069145 | A | | 6/2016 | |
| KR | 20170004965 | A | | 1/2017 | |
| KR | 20220008036 | A | | 1/2022 | |
| WO | 2008/120826 | A1 | | 10/2008 | |
| WO | 2009/107601 | A1 | | 9/2009 | |

OTHER PUBLICATIONS

Extended European Search Report issued Nov. 5, 2025 during prosecution of related application No. EP 23788382.

Korean Notice of Allowance issued Oct. 28, 2025 during prosecution of related Korean Patent Application No. 10-2024-7031756 (English translation included).

"Theoretical analysis of coupled oscillator array using resonant tunneling diodes in subterahertz and terahertz range", by M. Asada and S. Suzuki, Journal of Applied Physics, American Institute of Physics, J. Appl. Phys., vol. 103, 124514, published Jun. 27, 2008.

"Resonant Tunneling Diodes for Sub-Terahertz and Terahertz Oscillators", by Masahiro Asada et al., Japanese Journal of Applied Physics, Jpn. J. Appl. Phys., vol. 47, No. 6, published Jun. 13, 2008, pp. 4375-4384.

U.S. Appl. No. 18/359,187, filed Jul. 26, 2023, by Tatsuhito Goden.

U.S. Appl. No. 18/299,890, filed Apr. 13, 2023, by Koji Yukimasa.

U.S. Appl. No. 18/305,804, filed Apr. 24, 2023, by Takeaki Itsuji.

U.S. Appl. No. 18/307,268, filed Apr. 26, 2023, by Yasushi Koyama.

"Coherent Power Combination in Multi-Element Sub-THz RTD Oscillators Coupled with MIM Stub Structure", by Safumi Suzuki, Kenta Urayama, and Masahiro Asada, 20th International Conference on Indium Phosphide and Related Materials, on May 25-29, 2008; and published in IEEE Xplore on Dec. 9, 2008.

Extended European Search Report issued Jan. 26, 2026 during prosecution of corresponding European Application No. 23788384. 8.

"Injection- and Phase-Locking Techniques for Beam Control", by Robert A. York and Tatsuo Itoh, IEEE, Transactions on Microwave Theory and Techniques, vol. 46, No. 11, published Nov. 1, 1998, pp. 1920-1929, figures 1-12.

"Two-dimensional Unilaterally Coupled Active Antenna Arrays with Wide Angle Beam Scanning Capability", by Ragip Ispir, Shigeji Nogi and Minoru Sanagi, Department of Electrical and Electronic Engineering Okayama University, 29th European Microwave Conference, Munich 1999, pp. 68-71, figures 1-7.

"A Self-Mixing Active Antenna for Communication and Vehicle Identification Applications" by C. M. Montiel, et al., IEEE, Department of Electrical Engineering, Texas A&M University, published Jun. 17, 1996, pp. 333 to 336.

"Beam Control in Unilaterally Coupled Active Antennas With Self-Oscillating Harmonic Mixers" by Minoru Sanagi, et al., The Institute of Electronics, Information and Communication Engineers, Special Section on Recent Technologies of Microwave and Millimeter-Wave Devices, published Jul. 2005, vol. E88, No. 7, pp. 1375 to 1381.

"Surface-Wave Coupling of Active Antennas for Homodyne Sensor Systems" by Ralph H. Rasshofer, et al., IEEE, Transaction on Microwave Theory and Techniques, vol. 46, No. 12, published Dec. 1998, pp. 2457 to 2462.

"Terahertz coherent receiver using a single resonant tunnelling diode" by Yousuke Nishida, et al., Scientific Reports, Nature.com/scientificreports, published: 2019 9:18125 https://doi.org/10.1038/s41598-019-54627-8.

Extended European Search Report published Feb. 10, 2026 during prosecution of corresponding European Application No. 23788383. 0.

* cited by examiner

A-A' SECTIONAL VIEW

B-B' SECTIONAL VIEW

C-C' SECTIONAL VIEW

A-A' SECTIONAL VIEW

B-B' SECTIONAL VIEW

C-C' SECTIONAL VIEW

A-A' SECTIONAL VIEW

B-B' SECTIONAL VIEW

C-C' SECTIONAL VIEW

ANTENNA APPARATUS, COMMUNICATION APPARATUS, AND IMAGE CAPTURING SYSTEM

BACKGROUND OF THE INVENTION

Field of the Invention

The present invention relates to an antenna apparatus that outputs or detects an electromagnetic wave.

Description of the Related Art

As a current injection light source that generates an electromagnetic wave such as a terahertz wave, there is known an oscillator formed by integrating a resonator and an element having an electromagnetic wave gain with respect to a terahertz wave. Among these, an oscillator formed by integrating a Resonance Tunneling Diode (RTD) and an antenna is expected as an element that operates at room temperature in a frequency domain around 1 THz. Japanese Patent Laid-Open No. 2014-200065 discloses a terahertz-wave antenna array in which a plurality of active antennas each formed by integrating an RTD oscillator and an antenna are arranged on the same substrate. In the antenna array disclosed in Japanese Patent Laid-Open No. 2014-200065, coupling lines that mutually couple the plurality of active antennas are used to cause the plurality of active antennas to oscillate in the same phase in synchronism with each other.

In the antenna array described in Japanese Patent Laid-Open No. 2014-200065, it is possible to synchronize the phases of the plurality of active antennas with each other but it is impossible to apply beamforming of directing a beam in an arbitrary direction by controlling the phase difference between the active antennas.

SUMMARY OF THE INVENTION

The present invention provides a technique of making it possible to apply beamforming in an antenna apparatus including a plurality of active antennas.

According to a certain aspect of the invention, there is provided an antenna apparatus comprising: an antenna array in which a plurality of active antennas each including an antenna and a semiconductor structure configured to generate or detect an electromagnetic wave are arranged in an array; a coupling line configured to mutually couple two antennas respectively included in at least two active antennas among the plurality of active antennas; and an impedance variable device configured to make an impedance of the coupling line variable.

Further features of the present invention will become apparent from the following description of exemplary embodiments with reference to the attached drawings.

DESCRIPTION OF THE EMBODIMENTS

Figure 1A:
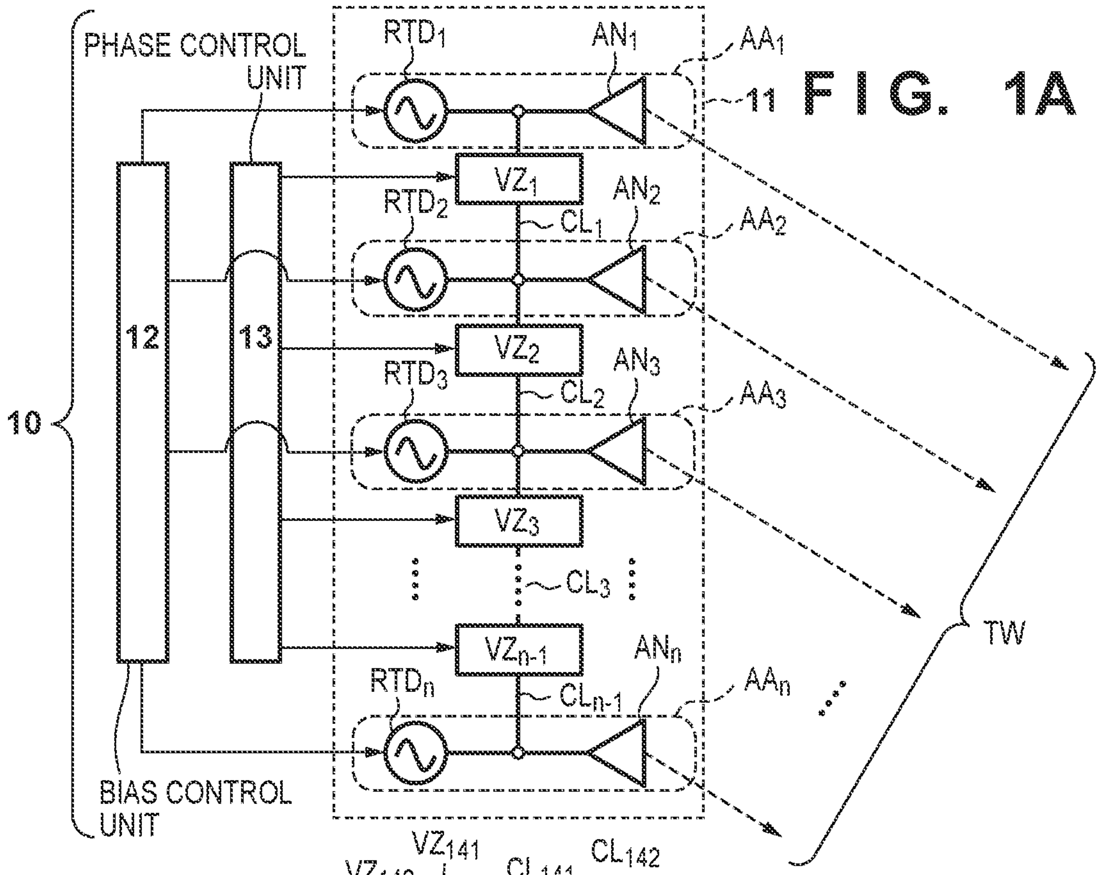
FIG. 1A is a block diagram showing an antenna apparatus 10.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

The arrangement of an antenna apparatus 10 applicable to a terahertz wave according to this embodiment will be described with reference to FIGS. 1A, 1B, 5A to 5E, and 7A to 7D. Note that a case in which the antenna apparatus 10 is used as a transmitter will particularly be described below but the antenna apparatus 10 can also be used as a receiver. A terahertz wave indicates an electromagnetic wave within a frequency range of 10 GHz (inclusive) to 100 THz (inclusive), and indicates, in an example, an electromagnetic wave within a frequency range of 30 GHz (inclusive) to 30 THz (inclusive).

(Arrangement Principle of Antenna Apparatus)

Figure 1B:
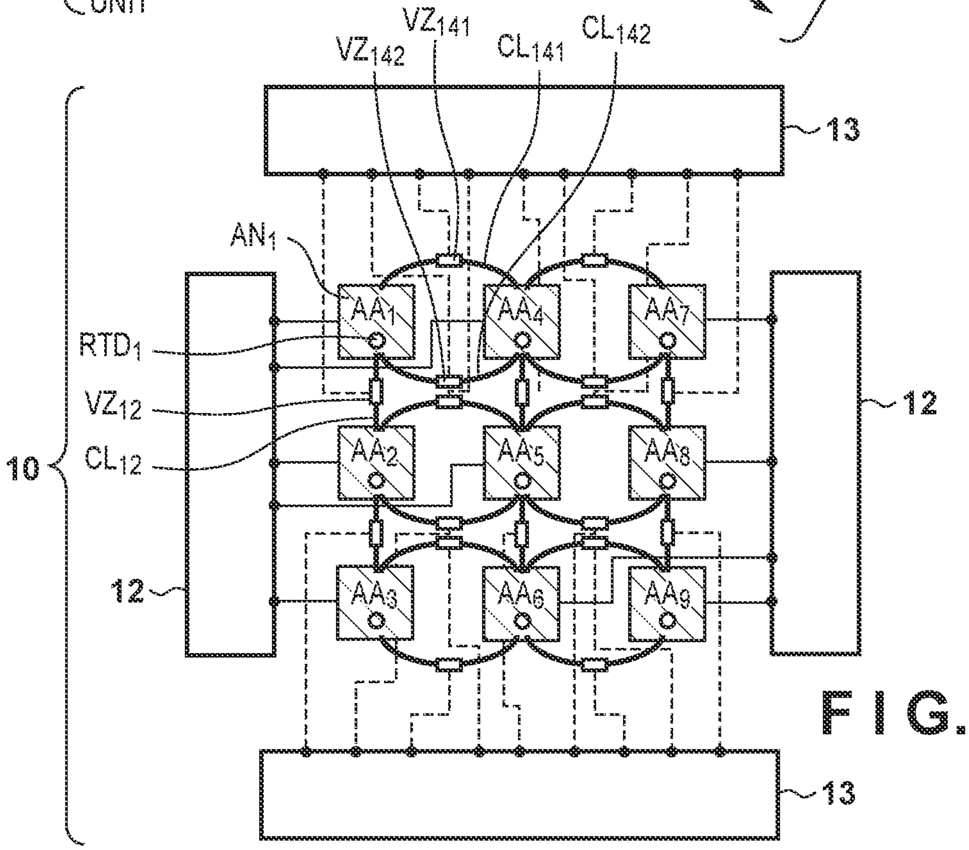
FIG. 1B is a schematic plan view showing an embodiment of the antenna apparatus 10.

FIG. 1A is a block diagram for explaining an example of the system configuration of the antenna apparatus 10, and FIG. 1B is a schematic plan view of the antenna apparatus 10 when viewed from above in an example. The antenna apparatus 10 includes an antenna array 11 formed from n active antennas $AA_1$ to $AA_n$ arranged in an array, a bias control unit 12, and a phase control unit 13. The active antenna $AA_1$ is formed by integrating at least one antenna $AN_1$ and a semiconductor layer $RTD_1$ as an oscillation source, and is configured to emit a terahertz wave TW of an oscillation frequency $f_{THz}$. Note that in the active antenna $AA_1$, components other than the semiconductor layer $RTD_1$ as an oscillation member may be interpreted as the antenna $AN_1$, and for example, only an antenna conductor or a combination of an antenna conductor and a ground (GND) conductor may be interpreted as the antenna $AN_1$. The same applies to the remaining active antennas $AA_2$ to $AA_n$. FIG. 1B shows an example of the arrangement in which a square patch antennas is used as an antenna and nine patch antennas are arrayed in a 3×3 matrix. Each of semiconductor layers $RTD_1$ to $RTD_n$ of the active antennas includes a semiconductor structure for generating or detecting a terahertz wave. This embodiment will describe an example of using a Resonant Tunneling Diode (RTD) as the semiconductor structure. Note that a semiconductor having nonlinearity of carriers (nonlinearity of a current along with a voltage change in the current-voltage characteristic) or an electromagnetic wave gain with respect to a terahertz wave suffices for the semiconductor structure, and the semiconductor structure is not limited to the RTD. Therefore, each of the semiconductor layers $RTD_1$ to $RTD_n$ will be sometimes referred to as a semiconductor layer 100 hereinafter. The bias control unit 12 is a power supply for controlling a bias signal to be applied to each of the semiconductor layers $RTD_1$ to $RTD_n$, and is electrically connected to each of the semiconductor layers $RTD_1$ to $RTD_n$.

The active antennas are electrically connected by coupling lines $CL_1$ to $CL_{n-1}$ as transmission lines for performing mutual injection locking between the antennas at a frequency $f_{osc}$. For example, the active antennas $AA_1$ and $AA_2$ are connected by the coupling line $CL_1$. The transmission line will be sometimes referred to as the coupling line hereinafter. An impedance variable device $VZ_1$ for adjusting the impedance of the coupling line between the active antennas $AA_1$ and $AA_2$ is connected to the intermediate point (that is, a position that is not an end portion) of the coupling line $CL_1$. Similarly, impedance variable devices $VZ_1$ to $VZ_{n-1}$ each for adjusting the impedance of the coupling line between the adjacent active antennas are connected to the intermediate points of the coupling lines $CL_1$ to $CL_{n-1}$, respectively. In the example of the 3×3 array shown in FIG. 1B, two coupling lines $CL_{141}$ and $CL_{142}$ as microstrip lines are connected to establish synchronization in the horizontal direction between active antennas $AA_1$ and $AA_4$. The coupling lines $CL_{141}$ and $CL_{142}$ are connected to impedance variable devices $VZ_{141}$ and $VZ_{142}$, respectively. Similarly, the coupling line $CL_{12}$ for establishing synchronization in the vertical direction and an impedance variable device $VZ_{12}$ connected to the intermediate point of the coupling line $CL_{12}$ are arranged between the active antennas $AA_1$ and $AA_2$. The reference numeral of each element in FIG. 1B will now be described. For example, with respect to the coupling line CL, the numerals of the two antennas $AA_1$ and $AA_n$ to be coupled and the number of antennas are represented. For example, the coupling line $CL_{14}$ is a coupling line that couples the antennas $AA_1$ and $AA_2$. For example, the antenna coupling line $CL_{142}$ is a coupling line that couples the antennas $AA_1$ and $AA_4$, and indicates a second coupling line. The same applies to the remaining coupling lines CL. The same also applies to the impedance variable device VZ. For example, the impedance variable device $VZ_{12}$ is an impedance variable device arranged between the antennas $AA_1$ and $AA_2$. The impedance variable device $VZ_{141}$ is the first impedance variable device arranged between the antennas $AA_1$ and $AA_4$.

Figure 5A:
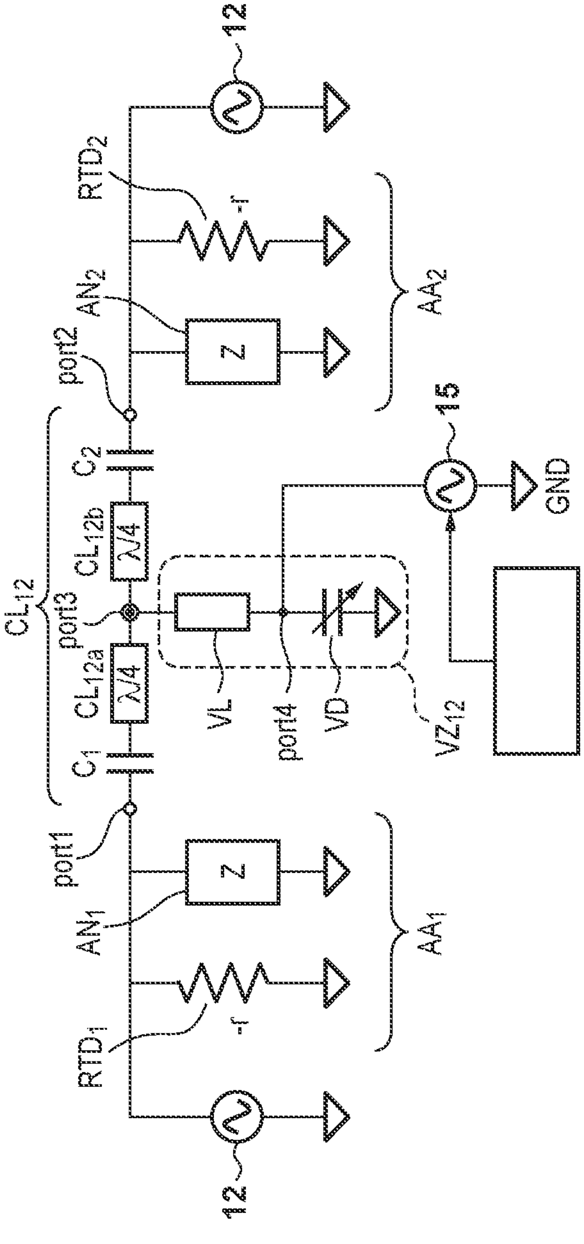
FIGS. 5A to 5E are circuit diagrams showing an antenna array and connection examples of an impedance variable device VZ.

FIG. 5A is a circuit diagram for explaining the impedance variable device VZ and the coupling line connected between the active antennas $AA_1$ and $AA_2$. Note that a description will be provided by focusing on the active antennas $AA_1$ and $AA_2$ but the same applies to the relationship between other active antennas. The active antenna $AA_1$ is an oscillator in which a negative resistance −r of the semiconductor layer $RTD_1$ and an impedance Z of the antenna $AN_1$ are connected in parallel. Similarly, the active antenna $AA_2$ is an oscillator in which a negative resistance −r of the semiconductor layer $RTD_2$ and an impedance Z of the antenna $AN_2$ are connected in parallel. The impedance Z includes a resistance component and an LC component (an inductive component and a capacitive component) caused by the structure of the antenna $AN_1$. In addition, the bias control unit 12 for supplying a bias signal to the semiconductor layer $RTD_1$ is connected in parallel with the semiconductor layer $RTD_1$. Note that the active antenna $AA_2$ also has the same arrangement. The bias control unit 12 supplies a current necessary to drive the semiconductor layers $RTD_1$ and $RTD_2$, and adjusts the bias signal applied to the semiconductor layers $RTD_1$ and $RTD_2$. If the RTD is used, the bias signal is selected so that a voltage in the negative differential resistance region of the RTD is applied to the RTD.

The adjacent active antennas $AA_1$ and $AA_2$ are connected to the coupling line $CL_{12}$ at ports 1 and 2, thereby mutually coupling the antennas in a terahertz frequency band. The coupling line $CL_{12}$ includes two series-connected lines $CL_{12a}$ and $CL_{12b}$, and these lines are connected to the active antennas $AA_1$ and $AA_2$ via capacitors $C_1$ and $C_2$. In this embodiment, the lines $CL_{12a}$ and $CL_{12b}$ are designed to be λ/4 lines. In this case, λ, represents the effective guide wavelength of the line at the oscillation frequency $f_{THz}$. The λ/4 line indicates a line having a length of λ/4. That is, the lines $CL_{12a}$ and $CL_{12b}$ are each designed to have a length of ¼ of the effective guide wavelength of the line at the oscillation frequency $f_{THz}$. The capacitors $C_1$ and $C_2$ function as high-pass filters, and are set to be capacitors configured to be short-circuited with respect to an electromagnetic wave in the terahertz band and to be open with respect to an electromagnetic wave in a low frequency band. A port 3 is a port for introducing the impedance variable device $VZ_{12}$ to the coupling line $CL_{12}$, and is arranged, in this embodiment, between the lines $CL_{12a}$ and $CL_{12b}$. The impedance variable device $VZ_{12}$ is formed from a line VL and a varactor diode VD which are series-connected. The capacity of the varactor diode VD changes depending on a power supply 15 connected via a port 4 for control arranged at the intermediate point between the line VL and the varactor diode VD. By adjusting the capacity of the varactor diode VD by the power supply 15, it is possible to arbitrarily adjust the end portion of the line VL from the release to the short circuit. Therefore, the impedance variable device $VZ_{12}$ functions as a stub that can change the impedance, to actively change the impedance of the connected coupling line $CL_{12}$, thereby adjusting the electrical length. By changing the electrical length between the ports 1 and 2, it is possible to control the phase difference between the active antennas $AA_1$ and $AA_2$ at the oscillation frequency $f_{THz}$. Similarly, with respect to other active antennas, the impedance variable devices $VZ_2$ to $VZ_1$ set the phases to generate a desired phase difference between the active antennas, thereby making it possible to implement beamforming in the antenna apparatus 10.

Figure 5D:
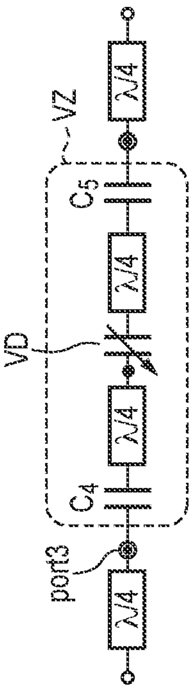
Figure 5E:
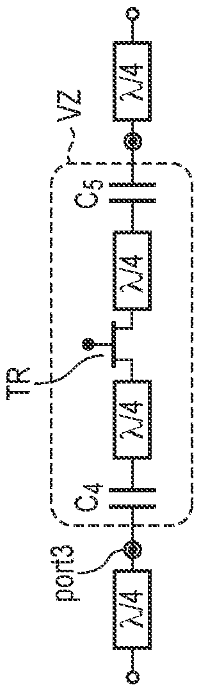
Figure 5C:
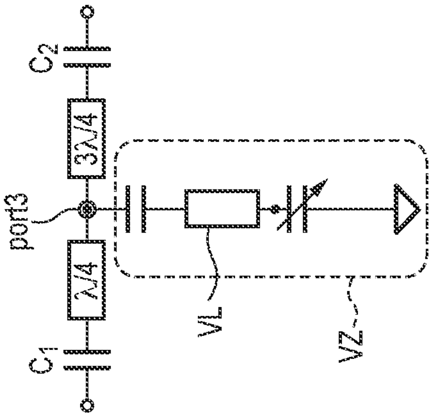
Figure 5B:
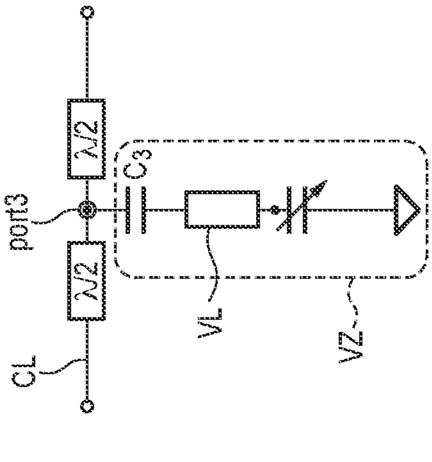
Figure 6A:
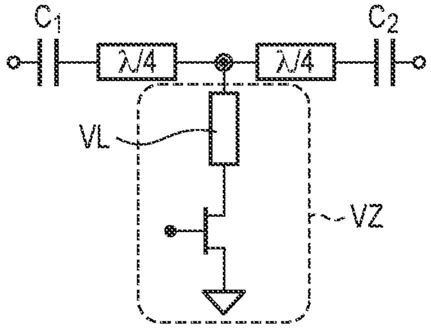
FIGS. 6A to 6F are circuit diagrams showing connection examples of the impedance variable device VZ.
Figure 6B:
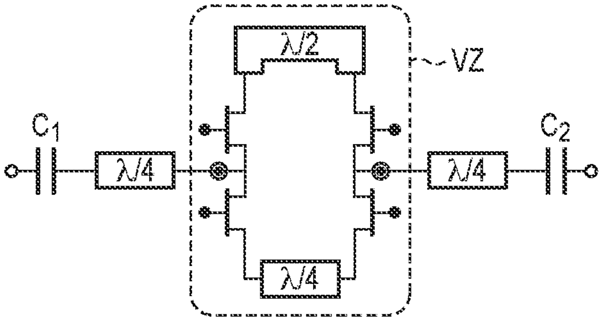
Figure 6C:
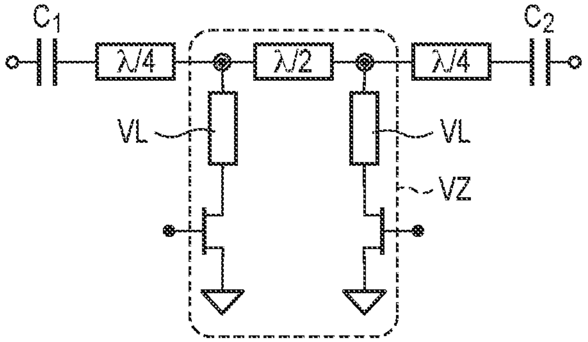
Figure 6D:
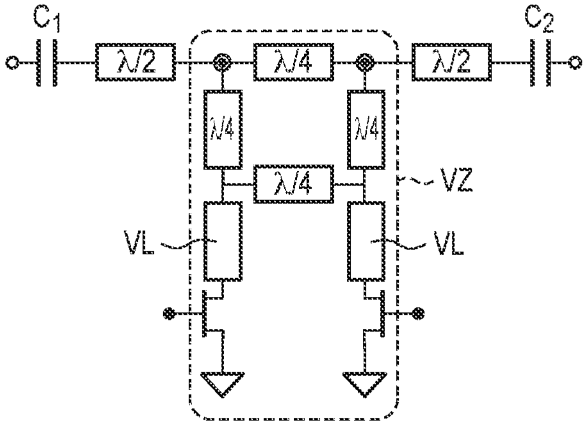

Note that the above-described arrangement is merely an example, and the impedance variable device VZ may be connected as shown in, for example, each of FIGS. 5B to 5E and 6A to 6F. For example, as shown in FIG. 5B or 5C, the line length of the line forming the coupling line CL may be changed to λ/2 or 3λ/4 in accordance with the design of the array antenna. To isolate the impedance variable device VZ and each active antenna in a low frequency band, a capacitor $C_3$ may be connected between the impedance variable device VZ and the port 3 or all the capacitor $C_1$ to $C_3$ may be used. Furthermore, as shown in FIG. 5D or 5E, such arrangement that the varactor diode VD or a transistor TR is series-connected to the intermediate point of the coupling line CL to be able to use a phase shift by a switch operation or capacity change may be used. FIGS. 6A to 6F each show an example of a circuit using the transistor TR for the impedance variable device $VZ_{12}$. FIG. 6A shows an example in which the transistor TR is used instead of the varactor diode VD of the impedance variable device VZ shown in FIG. 5A. In this case, a variable resistance and a switch operation between the source and the drain and a variable capacitor between the gate and the source can be used as the impedance variable device VZ. FIG. 6B shows an example of using a switched-line phase shifter as the impedance variable device VZ. In this arrangement, the phase of the coupling line CL can be switched to 0° and 90° by a switch operation. As shown in FIG. 6C or 6D, an analog phase shifter that adjusts the impedances of two stubs each obtained by combining the line VL and the transistor TR may be used.

(Implementation Example)

Figure 7A:
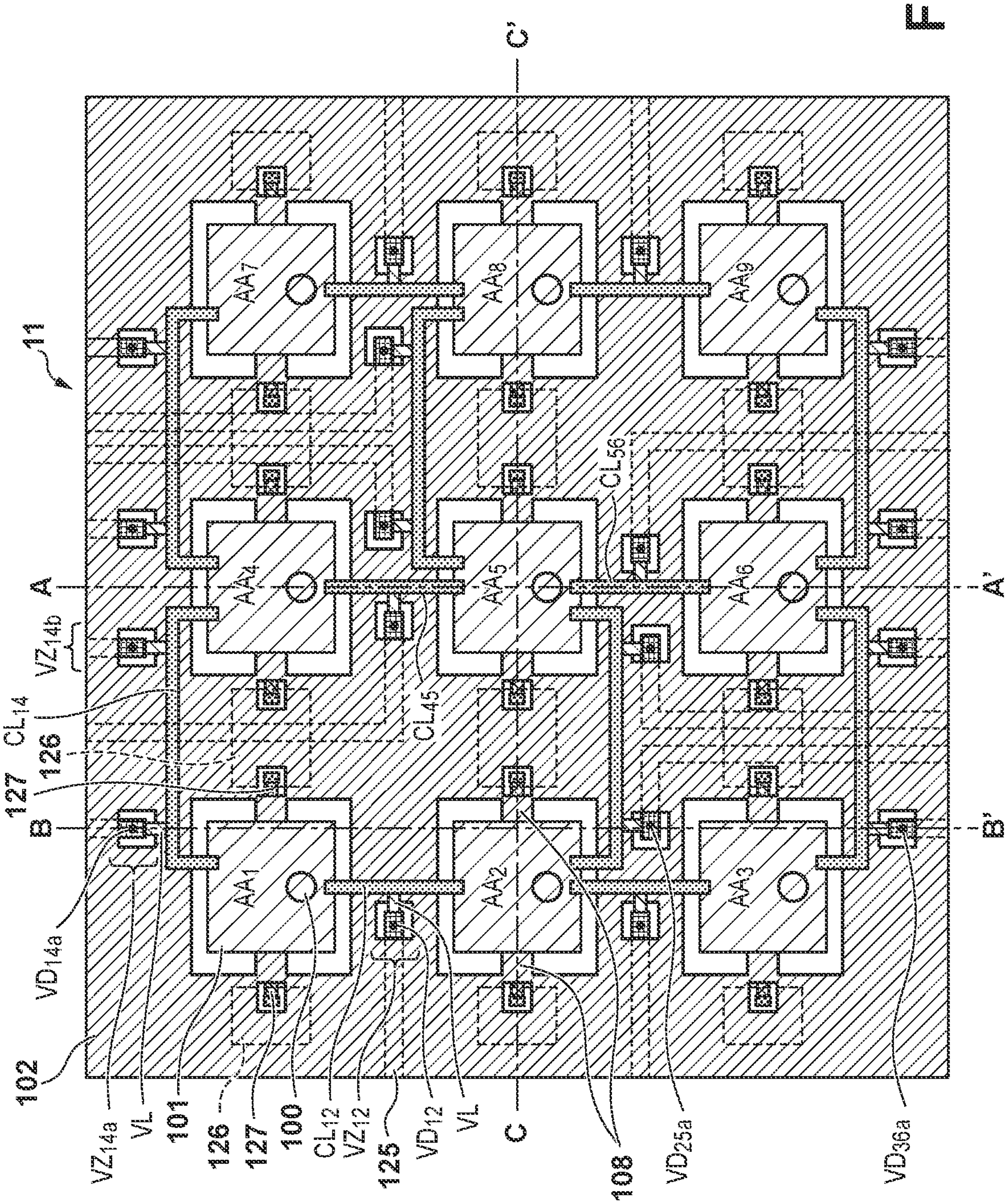
FIG. 7A is a plan view of the first example of the antenna array.
Figure 7B:
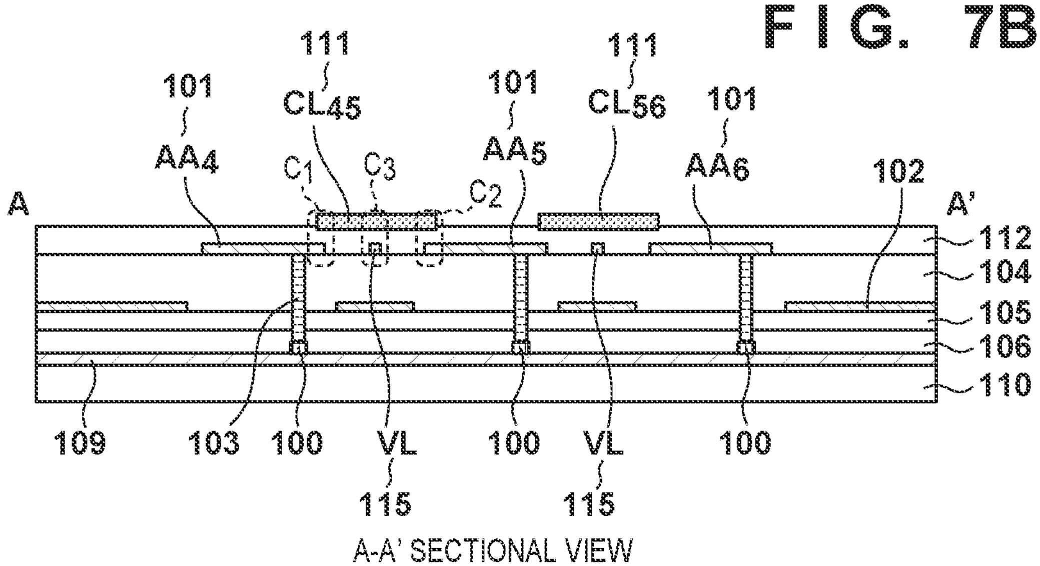
FIGS. 7B to 7D are sectional views of the first example of the antenna array.
Figure 7C:
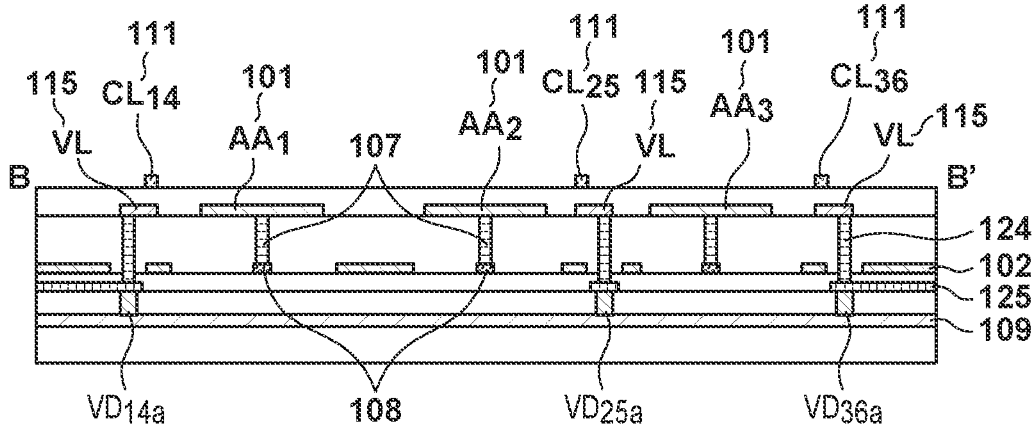
Figure 7D:
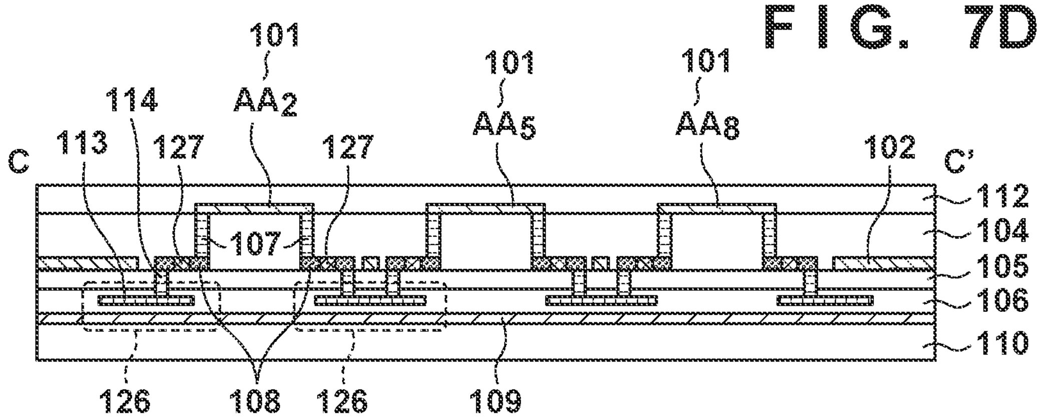

The structure and arrangement of the antenna apparatus 10 of the first embodiment will be described in detail with reference to FIGS. 7A to 7D. FIG. 7A is a schematic plan view of the antenna array 11 in which the nine active antennas $AA_1$ to $AA_9$ are arranged in a 3×3 matrix. FIGS. 7B to 7D are sectional views of the antenna array 11 taken along lines A-A', B-B', and C-C' in FIG. 7A, respectively. The antenna array 11 is an element that oscillates or detects the terahertz wave of the frequency $f_{THz}$, and is made of a semiconductor material. In this embodiment, as the antenna array 11, an antenna array in which the nine active antennas $AA_1$ to $AA_9$ are arranged in a 3×3 matrix will be exemplified. However, the present invention is not limited to this. For example, the active antennas may linearly be arranged or may be arranged in another form. In addition, the number of active antennas is not limited to nine, and even if the active antennas are arranged in a matrix, they may be arranged in a matrix other than the 3×3 matrix. Note that each of the active antennas $AA_1$ to $AA_9$ serves as a resonator that causes the terahertz wave to resonate and a radiator that transmits or receives the terahertz wave. In the antenna array 11, the active antennas can be arranged at a pitch (interval) equal to or smaller than the wavelength of the detected or generated terahertz wave or a pitch (interval) of an integer multiple of the wavelength.

The arrangement of each active antenna forming the antenna array 11 will first be described below. After that, the arrangement of the impedance variable device VZ will be described. Then, after a description of examples of practical materials and structure dimensions, a manufacturing method of the antenna array 11 will be explained. Note that the respective active antennas $AA_1$ to $AA_9$ have the same arrangement. Therefore, if it is unnecessary to particularly discriminate the active antennas $AA_1$ to $AA_9$, the term "active antenna AA" is collectively used. That is, the arrangement of the "active antenna AA" to be described below is applied to each of the active antennas $AA_1$ to $AA_9$ forming the antenna array 11.

(Active Antenna)

As shown in FIGS. 7B to 7D, the active antenna AA includes a substrate 110, a conductor layer 109, a conductor layer 101, and dielectric layers 104 to 106. Note that as shown in FIGS. 7B to 7D, the substrate 110, the conductor layer 109, and the conductor layer 101 are stacked in this order, and the dielectric layers 104 to 106 are located between the two conductor layers 109 and 101 (wiring layers). Note that the dielectric layers 104 to 106 are arranged in the order of the dielectric layer 106, the dielectric layer 105, and the dielectric layer 104 from the side of the conductor layer 109. The arrangement of the antenna shown in FIGS. 7B to 7D is called a microstrip antenna using a microstrip line having a finite length. An example of using a patch antenna as a microstrip resonator will now be described. The conductor layer 101 is the patch conductor of the active antenna AA (the upper conductor of the patch antenna) arranged to face the conductor layer 109 via the dielectric layers 104 to 106. The conductor layer 109 serves as an electrically grounded ground conductor (GND conductor), and also serves as a reflector layer. The active antenna AA is set to operate as a resonator in which the width of the conductor layer 101 in the A-A' direction (resonant direction) is $\lambda_{THz}/2$. Note that $\lambda_{THz}$ represents an effective wavelength, in the dielectric layers 104 to 106, of the terahertz wave that resonates in the active antenna AA. If $\lambda_0$ represents the wavelength of the terahertz wave in a vacuum, and ε represents the effective relative permittivity of the dielectric layer 104, $\lambda_{THz}=\lambda_0\times\varepsilon_r^{-1/2}$ is obtained.

The active antenna AA has the semiconductor structure as the semiconductor layer 100. The semiconductor layer 100 corresponds to each of the semiconductor layers $RTD_1$ to $RTD_9$ in FIGS. 1A and 1B, and is a Resonant Tunneling Diode (RTD) in this embodiment, as described above. The RTD is a typical semiconductor structure having an electromagnetic wave gain in the frequency band of the terahertz wave, and is also called an active layer. Therefore, the semiconductor layer 100 will be sometimes referred to as the "RTD" hereinafter. The RTD has a resonant tunneling structure layer including a plurality of tunneling barrier layers in which a quantum well layer is provided between the plurality of tunneling barrier layers, and has a multiquantum well structure for generating a terahertz wave by intersubband carrier transition. The RTD has an electromagnetic wave gain in the frequency domain of the terahertz wave based on a photon-assisted tunneling phenomenon in the negative differential resistance region of the current-voltage characteristic, and performs self-oscillation in the negative differential resistance region.

The semiconductor layer 100 is electrically connected to the conductor layer 101. The semiconductor structure is, for example, a mesa structure, and the semiconductor layer 100 includes an electrode (for example, an ohmic or Schottky electrode) for contact with the semiconductor structure and an electrode layer for connection to the upper and lower wiring layers. The ohmic electrode means ohmic contact to the semiconductor structure and the Schottky electrode means Schottky contact to the semiconductor structure. The semiconductor layer 100 is located in the active antenna AA, and is configured to oscillate or detect the electromagnetic wave of the terahertz wave. The semiconductor layer 100 is formed from a semiconductor layer having nonlinearity or an electromagnetic wave gain with respect to the terahertz wave.

The active antenna AA is an active antenna formed by integrating the semiconductor layer 100 and the patch antenna (antenna AN). The frequency $f_{THz}$ of the terahertz wave oscillated from the single active antenna AA is decided based on the resonance frequency of a fully-parallel resonant circuit obtained by combining the patch antenna and the reactance of the semiconductor layer 100. More specifically, with respect to a resonant circuit obtained by combining the admittances (YRTD and Yaa) of an RTD and an antenna from the equivalent circuit of the oscillator described in Jpn. J. Appl. Phys., Vol. 47, No. 6 (2008), pp. 4375-4384, a frequency satisfying an amplitude condition given by expression (1) and a phase condition given by equation (2) is decided as the oscillation frequency $f_{THz}$.

$$\mathrm{Re}[YRTD]+\mathrm{Re}[Y11]\leq 0 \quad (1)$$

$$\mathrm{Im}[YRTD]+\mathrm{Im}[Y11]=0 \quad (2)$$

where YRTD represents the admittance of the semiconductor layer 100, Re represents a real part, and Im represents an imaginary part. Since the semiconductor layer 100 includes the RTD as a negative resistance element, Re[YRTD] has a negative value. Y11 represents the admittance of the whole structure of the active antenna $AA_1$ when viewed from the semiconductor layer 100.

Note that as the semiconductor layer 100, a Quantum Cascade Laser (QCL) having a semiconductor multilayer structure of several hundred to several thousand layers may be used. In this case, the semiconductor layer 100 is a semiconductor layer including the QCL structure. As the semiconductor layer 100, a negative resistance element such as a Gunn diode or IMPATT diode often used in the millimeter wave band may be used. As the semiconductor layer 100, a high frequency element such as a transistor with one terminal terminated may be used, and a heterojunction bipolar transistor (HBT), a compound semiconductor FET, a high electron mobility transistor (HEMT), or the like can be used as the transistor. As the semiconductor layer 100, a negative differential resistance of the Josephson device using a superconductor layer may be used. That is, the semiconductor layer 100 need not be the RTD as long as it has the semiconductor structure for generating or detecting an electromagnetic wave in a predetermined frequency band, and an arbitrary structure having the same characteristic may be used. In this example, the RTD is used as a component suitable for the terahertz wave, but an antenna array corresponding to an electromagnetic wave in an arbitrary frequency band may be implemented by an arrangement described in this embodiment. That is, the semiconductor layer 100 according to this embodiment is not limited to the RTD that outputs the terahertz wave, and can be formed using a semiconductor that can output an electromagnetic wave in an arbitrary frequency band.

If the microstrip resonator such as a patch antenna has a thick dielectric layer, a conductor loss is reduced and the radiation efficiency is improved. It is required for the dielectric layers 104 to 106 that a thick film can be formed (typically, 3 μm or more), a low loss/low dielectric constant is obtained in the terahertz band, and fine processability is high (planarization or etching). As the thickness of the dielectric layer is larger, the radiation efficiency is higher, but if the thickness is too large, multi-mode resonance may occur. Therefore, the thickness of the dielectric layer can be designed within a range whose upper limit is 1/10 of the oscillation wavelength. On the other hand, to implement the high frequency and high output of the oscillator, micronization and high current density of the diode need to be implemented. To do this, the dielectric layer is also required to suppress a leakage current and take measures against migration as the insulating structure of the diode. To satisfy the above two requirements, dielectric layers of different materials may be used as the dielectric layers 104 to 106.

As the material of the dielectric layer 104, an organic dielectric material such as benzocyclobutene (BCB of the Dow Chemical Company, $\varepsilon_{r1}=2$), polytetrafluoroethylene, or polyimide can be used. In this example, Ea represents the relative permittivity of the first dielectric layer 104. A TEOS oxide film that can form a relatively thick film and has a low dielectric constant or an inorganic dielectric material such as spin-on-glass may be used for the first dielectric layer 104. The dielectric layers 105 and 106 are required to have an insulation property (the property of behaving as an insulator or high resistor that does not conduct electricity with respect to a DC voltage), a barrier property (the property of preventing spread of a metal material used for an electrode), and processability (processibility with sub-micron accuracy). As a material satisfying these properties, for example, an inorganic insulator material such as silicon oxide ($\varepsilon_{r2}=4$), silicon nitride ($\varepsilon_{r2}=7$), aluminum oxide, or aluminum nitride is used. $\varepsilon_{r2}$ represents the relative permittivity of the dielectric layers 105 and 106.

As in this embodiment, if the dielectric layers 104 to 106 have a multilayer arrangement, the relative permittivity Er of the dielectric layers 104 to 106 is the effective relative permittivity decided based on the thickness and relative permittivity $\varepsilon_{r1}$ of the dielectric layer 104 and the thickness and relative permittivity $\varepsilon_{r2}$ of the dielectric layers 105 and 106. To decrease the difference in dielectric constant between the antenna and air from the viewpoint of impedance matching between the antenna and a space, a material different from that of the dielectric layers 105 and 106 and having a low relative permittivity ($\varepsilon_{r1}<\varepsilon_{r2}$) can be used for the dielectric layer 104. Note that in the antenna apparatus 10, the dielectric layer need not have a multilayer arrangement, and may have a structure formed by a layer of one of the above-described materials.

The semiconductor layer 100 is arranged on the conductor layer 109 formed on the substrate 110. The semiconductor layer 100 and the conductor layer 109 are electrically connected to each other. Note that to reduce an ohmic loss, the semiconductor layer 100 and the conductor layer 109 can be connected with low resistance. A via 103 is arranged on the opposite side of the side on which the conductor layer 109 is arranged with respect to the semiconductor layer 100, and is electrically connected to the semiconductor layer 100. The semiconductor layer 100 is embedded in the dielectric layer 106, and the dielectric layer 106 covers the periphery of the semiconductor layer 100.

The semiconductor layer 100 includes an ohmic electrode as a conductor that makes ohmic contact to the semiconductor to reduce RC delay and an ohmic loss caused by series resistance. As the material of the ohmic electrode, for example, Ti/Au, Ti/Pd/Au, Ti/Pt/Au, AuGe/Ni/Au, TiW, Mo, ErAs, or the like can be used. Note that this material is represented by chemical symbols, and a material represented by each chemical symbol will not be described in detail. The same applies to the following description. By decreasing the contact resistance using a semiconductor in which a region where the semiconductor contacts the ohmic electrode is doped with impurities at a high concentration, high output and a high frequency can be implemented. If the RTD is used as the semiconductor layer 100, the absolute value of the negative resistance indicating the magnitude of the gain of the RTD used in the terahertz wave band is on the order of about 1 to 100Ω), a loss of an electromagnetic wave can be suppressed to 1% or less. Therefore, the contact resistance in the ohmic electrode can be suppressed to 1Ω) or less as a guide. To operate in the terahertz wave band, the semiconductor layer 100 is formed to have a width of about 0.1 to 5 μm as a typical value. Therefore, the contact resistance is suppressed within the range of 0.001Ω) to several Ω by setting the resistivity to 10 $\Omega\cdot\mu m^2$ or less.

The semiconductor layer 100 may be configured to include a metal (Schottky electrode) that makes not ohmic contact but Schottky contact. In this case, the contact interface between the Schottky electrode and the semiconductor exhibits a rectifying property, and the active antenna AA can be used as a terahertz wave detector. Note that an arrangement using an ohmic electrode will be described below.

As shown in FIG. 7B, the substrate 110, the conductor layer 109, the semiconductor layer 100, the via 103, the conductor layer 101, and a conductor layer 111 are stacked in the active antenna AA in this order. The via 103 is a conductor formed in the dielectric layers 104 to 106, and the conductor layer 101 and the semiconductor layer 100 are electrically connected via the via 103. If the width of the via 103 is too large, the radiation efficiency deteriorates due to deterioration of the resonance characteristic of the patch antenna and an increase in parasitic capacitance. Therefore, the width of the via 103 can be set to a width that does not interfere with a resonance electric field, typically, to 1/10 or less of the effective wavelength λ of the standing terahertz wave of the oscillation frequency $f_{THz}$ in the active antenna AA. The width of the via 103 may be small to the extent that series resistance is not increased, and can be reduced to about twice a skin depth as a guide. Considering that the series resistance is decreased to a value not exceeding 1Ω, the width of the via 103 typically falls within the range of 0.1 μm (inclusive) to 20 μm (inclusive), as a guide.

Referring to FIG. 7C, the conductor layer 101 is electrically connected to a wiring 108 via a via 107, and the wiring 108 is electrically connected to the bias control unit 12 shown in the circuit diagram of FIG. 5A via a bias wiring layer 102 as a common wiring formed in the chip. The bias control unit 12 can also be called a power circuit. The wiring layer 102 is arranged at an intermediate point between the dielectric layers 104 and 105. The wiring 108 is extracted from each antenna. The bias control unit 12 is a power supply for supplying a bias signal to the semiconductor layer 100 of the active antenna AA. Therefore, if the wiring layer 102 is connected to the wiring 108 extracted from each of adjacent antennas, the bias signal is supplied to the semiconductor layer 100 of each antenna. Since the bias wiring layer 102 is common, it is possible to ensure a sufficient wiring width. Thus, it is possible to reduce the variation of the operating voltage between the antennas caused by the variation of wiring resistance, and synchronization is stabilized even if the number of arrays increases. It is possible to obtain a symmetric structure around the antennas and thus the radiation pattern is not broken.

The via 107 is a connecting portion for electrically and mechanically connecting the wiring 108 to the conductor layer 101. A structure that electrically connects the upper and lower layers is called a via. In addition to the role as a member forming the patch antenna, the conductor layers 109 and 101 are connected to these vias to serve as an electrode for injecting a current into the RTD as the semiconductor layer 100. In this embodiment, as the vias 103 and 107 and a via 124, a material having a resistivity of 1×10−6 Ω·m or less can be used. More specifically, as the material, a metal or a metal compound such as Ag, Au, Cu, W, Ni, Cr, Ti, Al, AuIn alloy, or TiN is used.

The width of the via 107 is smaller than that of the conductor layer 101. The width of the conductor layer 101 corresponds to the width in the electromagnetic wave resonance direction (that is, the A-A' direction) in the active antenna AA. The width of a portion (connecting portion) of the wiring 108 connected to the via 107 is smaller (thinner) than that of the conductor layer 101 (active antenna AA). These widths can be 1/10 or less (λ/10 or less) of the effective wavelength λ of the standing terahertz wave of the oscillation frequency $f_{THz}$ in the active antenna AA. This is because if the via 107 and the wiring 108 are arranged at positions with widths such that they do not interfere with a resonance electric field in the active antenna AA, the radiation efficiency can be improved.

The position of the via 107 can be arranged at the node of the electric field of the standing terahertz wave of the oscillation frequency $f_{THz}$ in the active antenna AA. At this time, the via 107 and the wiring 108 are configured so that the impedance is sufficiently higher than the absolute value of the negative differential resistance of the RTD as the semiconductor layer 100 in the frequency band around the oscillation frequency $f_{THz}$. In other words, the via 107 and the wiring 108 are connected to the active antenna AA so as to obtain a high impedance when viewed from the RTD at the oscillation frequency $f_{THz}$. In this case, the active antenna AA is isolated (separated) in a path via the bias wiring layer 102 at the frequency $f_{THz}$. Thus, a current of the oscillation frequency $f_{THz}$ induced by each active antenna does not influence the adjacent antenna via the wiring layer 102 and the bias control unit 12. In addition, interference between the standing electric field of the oscillation frequency $f_{THz}$ in the active antenna AA and these power supply members is suppressed.

The bias wiring layer 102 is a bias wiring common to the plurality of active antennas AA. Note that the bias control unit 12 is arranged outside the chip to supply a bias signal to the semiconductor layer 100 of each antenna. The bias control unit 12 includes a stabilization circuit for suppressing a parasitic oscillation of a low frequency. The stabilization circuit is set to have an impedance lower than the absolute value of the negative resistance corresponding to the gain of the semiconductor layer 100 in a frequency band from Direct Current (DC) to 10 GHz. To stabilize a relatively high frequency of 0.1 to 10 GHz, an AC short circuit is arranged, for each active antenna, by series-connecting a resistance layer 127 of TiW and a Metal-Insulator-Metal (MIM) capacitor 126, as shown in FIG. 7D. In this case, the MIM capacitor 126 has a large capacity within the above-described frequency range, and has a capacity of about several pF in an example. The MIM capacitor 126 of this embodiment uses a structure in which part of the dielectric layer 106 is sandwiched by a conductor layer 113 and the conductor layer 109 as GND.

(Antenna Array)

The antenna array 11 shown in FIG. 7A has an arrangement in which the nine active antennas $AA_1$ to $AA_9$ are arranged in a 3×3 matrix, and each of these active antennas singly oscillates the terahertz wave of the frequency $f_{THz}$. Note that the number of active antennas is not limited to nine. For example, 16 active antennas may be arranged in a 4×4 matrix, or 15 active antennas may be arranged in a 3×5 matrix. The adjacent antennas are mutually coupled by the coupling line CL, and are synchronized with each other by a mutual injection locking phenomenon at the oscillation frequency $f_{THz}$ of the terahertz wave. The mutual injection locking phenomenon is a phenomenon in which a plurality of self oscillators are pulled by interaction to oscillate in synchronism with each other. For example, the active antennas $AA_1$ and $AA_4$ are mutually coupled by the coupling line $CL_{14}$, and are mutually coupled via the conductor layer 109. The same applies to other adjacent active antennas. Note that "mutually coupled" indicates such relationship that when a current induced by a given active antenna acts on another adjacent active antenna by the coupling, the transmission/reception characteristic of one another is changed. If the mutually coupled active antennas are synchronized with each other in the same phase or opposite phases, the mutual injection locking phenomenon causes electromagnetic waves to strengthen or weaken each other between the active antennas. This can adjust the increase/decrease of the gain of the antenna. Note that in this embodiment, to generally represent the coupling line that couples the active antennas, it is described as the coupling line CL. A coupling line that forms the coupling line CL and couples the antennas is described using a numeral and alphabet corresponding to each active antenna. For example, the coupling line that couples the active antennas $AA_1$ and $AA_4$ is described as the coupling line $CL_{14}$.

The oscillation condition of the antenna array 11 is decided by the condition of mutual injection locking in an arrangement in which two or more individual RTD oscillators are coupled, which is described in J. Appl. Phys., Vol. 103, 124514 (2008). More specifically, consider the oscillation condition of the antenna array in which the active antennas $AA_1$ and $AA_2$ are coupled by the coupling line $CL_{12}$. At this time, two oscillation modes of positive-phase mutual injection locking and negative-phase mutual injection locking occur. The oscillation condition of the oscillation mode (even mode) of positive-phase mutual injection locking is represented by expression (4) and equation (5), and the oscillation condition of the oscillation mode (odd mode) of negative-phase mutual injection locking is represented by expression (6) and equation (7).

positive phase (even mode): frequency f=feven $$Yeven=Y11+Y12+YRTD$$

$$Re(Yeven)\leq 0 \quad (4)$$

$$Im(Yeven)=0 \quad (5)$$

negative phase (odd mode): frequency f=fodd $$Yodd=Y11+Y12-YRTD$$

$$Re(Yodd)\leq 0 \quad (6)$$

$$Im(Yodd)=0 \quad (7)$$

where Y12 represents the mutual admittance between the active antennas $AA_1$ and $AA_2$. Y12 is proportional to a coupling constant representing the strength of coupling between the antennas, and ideally, the real portion of −Y12 is large and the imaginary portion is zero. In the antenna array 11 of this embodiment, the active antennas are coupled under the condition of positive-phase mutual injection locking, and oscillation frequency $f_{THz}\approx$feven is obtained. Similarly, with respect to the remaining antennas, the antennas are coupled by the coupling line CL to satisfy the above-described condition of positive-phase mutual injection locking.

The coupling line CL is a microstrip line obtained by sandwiching the dielectric layers 104 to 106 and a dielectric layer 112 by the conductor layer 111 and the conductor layer 109 or the wiring layer 102. For example, as shown in FIG. 7B, a coupling line $CL_{45}$ has a structure in which the dielectric layers 104 to 106 and 112 are sandwiched by the conductor layer 111 ($CL_{45}$) and the conductor layer 109 or the wiring layer 102. Similarly, a coupling line $CL_{56}$ has a structure in which the dielectric layers 104 to 106 and 112 are sandwiched by the conductor layer 111 ($CL_{56}$) and the conductor layer 109 or the wiring layer 102.

The antenna array 11 is an antenna array having an arrangement in which the antennas are coupled by AC coupling (capacitive coupling). For example, in a planar view, the conductor layer 111 as the upper conductor layer of the coupling line $CL_{45}$ overlaps a conductor layer 101 as the patch conductor of each of the active antennas $AA_4$ and $AA_5$ by sandwiching the dielectric layer 112, and is connected to the conductor layer 101 by capacitive coupling. More specifically, in a planar view, the conductor layer 111 of the coupling line $CL_{45}$ overlaps the conductor layer 101 by only 5 μm by sandwiching the dielectric layer 112 near the radiation end of each of the active antennas $AA_4$ and $AA_5$, thereby forming each of capacitor structures $C_1$ and $C_2$. The capacitor structures $C_1$ and $C_2$ correspond to the capacitors $C_1$ and $C_2$ in the circuit diagram shown in FIG. 5A or 5C. The capacitors $C_1$ and $C_2$ of this arrangement function as high-pass filters, and contribute to suppression of multi-mode oscillation by being short-circuited with respect to a terahertz band and being open with respect to a low frequency band. However, this arrangement is not an essential requirement, and an arrangement of DC coupling such that the conductor layer 111 of the coupling line $CL_{45}$ and the conductor layers 101 of the active antennas $AA_4$ and $AA_5$ are directly coupled (directly connected) may be used. Since the antenna array synchronized by DC coupling can synchronize the adjacent antennas by strong coupling, the antenna array readily performs a pull-in synchronization operation, and is resistant against variations of the frequency and phase of the antenna. Note that coupling between the active antennas $AA_4$ and $AA_5$ has been exemplified, but the same applies to couplings among the remaining active antennas $AA_1$ to $AA_9$.

In the antenna array 11, the conductor layer 101 of the active antenna AA, the conductor layer 111 of the coupling line CL, and the bias wiring layer 102 are arranged in different layers. That is, the conductor layer 101 of the active antenna AA and the conductor layer 111 of the coupling line CL that transmit a high frequency ($f_{THz}$) and the bias wiring layer that transmits a low frequency (DC to several tens of GHz) are arranged in different layers. This can freely set the width, the length, and the layout, such as routing, of the transmission line in each layer. As shown in FIG. 7A, the coupling line CL and the bias wiring layer 102 intersect each other when viewed from above (in a planar view), thereby obtaining a layout-saving arrangement. This can increase the number of antennas to be arranged even in an antenna array in which antennas are arranged in an m×n (m≥2, n≥2) matrix. Furthermore, impedance control of the coupling line CL and bias control of the semiconductor layer 100 can be executed individually.

Note that since resistance by the skin effect increases in the terahertz band, a conductor loss along with high-frequency transmission between antennas is not negligible. Along with an increase in current density between conductor layers, a conductor loss (dB/mm) per unit length increases. In the case of a microstrip line, a conductor loss (dB/mm) per unit length is inversely proportional to the square of a dielectric thickness. Therefore, it is possible to increase the radiation efficiency of the antenna array by increasing the thickness of the dielectric forming the coupling line CL in addition to the antenna to reduce a conductor loss. To the contrary, the antenna array 11 of this embodiment has an arrangement in which the bias wiring layer 102 is arranged in the dielectric layer 105, and the conductor layer 101 of the antenna and the conductor layer 111 of the coupling line CL that transmit a high frequency of the frequency $f_{THz}$ are arranged in the upper layer of the dielectric layer 104. This arrangement can suppress a decrease in radiation efficiency of the antenna array along with a conductor loss in the terahertz band. From the viewpoint of a conductor loss, the thickness of the dielectric forming the coupling line CL is preferably 1 μm or more. In an example, the dielectric thickness is set to 2 μm or more, and thus a loss by a conductor loss in the terahertz band is suppressed to about 20%. Similarly, from the viewpoint of a conductor loss, a wide interval in the thickness direction between the conductor layer 111 forming the coupling line CL and the wiring layer 102 and conductor layer 109 can be ensured. The bias wiring layer 102 can be made to function as a low-impedance line up to a gigahertz band or thereabouts by setting the dielectric thickness to 2 μm or less, or 1 μm or less in an example. Even if the dielectric thickness is set to 2 μm or more, it is possible to suppress low-frequency oscillation by connecting, to the bias wiring layer 102, a shunt component formed by the resistance layer 127 and the MIM capacitor 126 to function as a low-impedance line, as in this embodiment.

Note that the length of the conductor layer 111 (coupling line CL) is designed to satisfy a phase matching condition in one or both of the horizontal direction (magnetic field direction/H direction) and the vertical direction (electric field direction/E direction) if the adjacent antennas are connected by the coupling line. The coupling line CL can be designed to have, for example, such length that the electrical length between the RTDs of the adjacent antennas is equal to an integer multiple of 2π. That is, the length of the coupling line CL is set so that the length of a path via the coupling line CL when the RTDs are connected by the coupling line CL is equal to an integer multiple of the wavelength of a propagated electromagnetic wave. For example, in FIG. 7A, the coupling line $CL_{14}$ extending in the horizontal direction can be designed to have such length that the electrical length between the semiconductor layers 100 of the active antennas $AA_1$ and $AA_4$ is equal to 4π. Furthermore, the coupling line $CL_{12}$ extending in the vertical direction can be designed to have such length that the electrical length between the semiconductor layers 100 of the active antennas $AA_1$ and $AA_2$ is equal to 2π. Note that the electrical length indicates a wiring length considering the propagation speed of the electromagnetic wave of the high frequency that propagates in the coupling line CL. The electrical length of a corresponds to the length of one wavelength of the electromagnetic wave propagating in the coupling line CL. With such design, the semiconductor layers 100 of the active antennas $AA_1$ to $AA_9$ are mutual injection-locked in the positive phase. Note that the error range of the electrical length within which mutual injection locking occurs is ±¼π.

The active antennas $AA_1$ to $AA_9$ forming the antenna array 11 are supplied with power by the common bias wiring layer 102 arranged among the antennas. By sharing, among the antennas, the bias wiring layer 102 as the wiring in the chip, driving in the same channel is possible and the driving method can be simplified. In this arrangement, since the number of wirings is decreased and one wiring can be thickened, it is possible to suppress an increase in wiring resistance along with an increase in number of arrays and a deviation in operating point among the antennas along with that. This can suppress deviations in frequency and phase among the antennas caused by the increase in number of arrays, thereby more easily obtaining the synchronization effect by the array. Note that the common bias wiring layer 102 is not an essential component. For example, by stacking or miniaturizing a multilayer wiring, a plurality of bias wiring layers 102 may be prepared for the respective antennas to individually supply power, like an antenna array 41 shown in FIGS. 9A to 9D to be described later. In this case, since isolation via the bias wiring layer 102 between the antennas is enhanced, the risk of a low-frequency parasitic oscillation can be reduced. Furthermore, signal modulation control for each antenna can be performed by individual control of a bias signal. The bias wiring layer 102 can be configured to have a low impedance, as compared with the negative resistance of the semiconductor layer 100, in a low frequency band lower than the oscillation frequency $f_{THz}$. An impedance of a value equal to or slightly smaller than the absolute value of the combined negative differential resistance of all the semiconductor layers 100 connected in parallel in the antenna array 11 is preferable. This can suppress a low-frequency parasitic oscillation.

(Impedance Variable Device)

As the impedance variable device VZ, the varactor diode VD that can be integrated on the same substrate as the InP-based RTD can be used. An impedance variable device $VZ_{14}$ arranged between the active antennas $AA_1$ and $AA_4$ will now be described. As shown in FIG. 7B, the conductor layer 111 ($CL_{45}$) of the coupling line $CL_{45}$ and an upper conductor 115 (VL) of the line VL overlap each other by sandwiching the dielectric layer 112 in a planar view, thereby forming the capacitor $C_3$. This couples, for example, the conductor layer 111 of the coupling line $CL_{45}$ and the upper conductor 115 of the line VL via the capacitor $C_3$ of 20 fF. The line VL is formed from a λ/4 line of a microstrip line, and is connected to a wiring layer 125 for impedance control arranged on the dielectric layer 106 made of silicon oxide having a thickness of 1 μm via the Cu via 124 connected to the conductor layer 115 as the upper conductor. As shown in FIG. 7D, the wiring layer 125 is electrically connected to one terminal of a varactor diode $VD_{14a}$ formed in the dielectric layer 106, and the other terminal is electrically connected to the conductor layer 109 as a GND layer. The wiring layer 125 is connected to a power circuit in the phase control unit 13, and changes the capacity of the varactor diode $VD_{14a}$ by controlling a voltage signal to be applied to the varactor diode $VD_{14a}$. Since the absolute value of the negative resistance of the RTD is on the order of about 1 to 100Ω), the variable impedance range of the impedance variable device VZ in the terahertz wave band is a range of about 0.1 to 1,000Ω) with respect to both the real portion and the imaginary portion. For example, a range of 0.1 pF to 1 nF can be selected as a corresponding variable capacity range in the terahertz wave band. This range can be designed to an arbitrary capacity range by the area of the varactor diode VD and a method such as a connection method (parallel/series). The impedance of the impedance variable device VZ including the line VL and the varactor diode VD is changed from capacitive to inductive, thereby changing the electrical length of the coupling line CL. This adjusts the phase between the active antennas $AA_1$ and $AA_4$ to a specific value. The coupling lines CL among the remaining active antennas $AA_1$ to $AA_9$ have the same arrangement to generate arbitrary phase differences among the antennas, thereby performing beamforming.

(Practical Material and Structure Dimensions)

A practical example of the antenna array 11 will be described. The antenna array 11 is a semiconductor device that can perform single-mode oscillation in a frequency band of 0.45 THz (inclusive) to 0.50 THz (inclusive). The substrate 110 is a semi-insulating InP substrate. The semiconductor layer 100 is formed from a multiquantum well structure by InGaAs/AlAs lattice-matched on the substrate 110, and an RTD having a double-barrier structure is used in this embodiment. This is also called the semiconductor heterostructure of the RTD. As the current-voltage characteristic of the RTD used in this embodiment, the measurement value of the peak current density is 9 mA/μm$^2$, and the measurement value of the negative differential conductance per unit area is 10 mS/μm$^2$. The semiconductor layer 100 is formed in a mesa structure, and is formed from the semiconductor structure including the RTD, and an ohmic electrode for electrical connection to the semiconductor structure. The mesa structure has a circular shape with a diameter of 2 and the magnitude of the negative differential resistance of the RTD at this time is about −30Ω) per diode. In this case, it is estimated that the negative differential conductance of the semiconductor layer 100 including the RTD is about 30 mS and the diode capacity is about 10 fF.

The varactor diode VD of this embodiment is formed using, for example, a semiconductor stacked structure of n+InGaAs/n-InGaAs/p+InGaAs that can be integrated simultaneously on the InP substrate, and is continuously, epitaxially grown on the semiconductor structure including the RTD. Therefore, with respect to a location where the semiconductor layer 100 is arranged, the semiconductor structure including the RTD is exposed by removing, by etching, the n+InGaAs/n−InGaAs/p+InGaAs layer of the surface layer, and then used. The mesa structure of the varactor diode VD has a circular shape with a diameter of 4 μm, and the capacity can be adjusted within a range of 0.1 to 1 pF by changing the range of a voltage to be applied from −5 V to +1 V.

The active antenna AA is a patch antenna having a structure in which the dielectric layers 104 to 106 are sandwiched by the conductor layer 101 as a patch conductor and the conductor layer 109 as a ground conductor. This patch antenna is a square patch antenna in which one side of the conductor layer 101 is 150 μm, and the resonator length (L) of the antenna is 150 μm. In the antenna, the semiconductor layer 100 including the RTD is integrated.

The conductor layer 101 as a patch conductor is formed by a metal layer (Ti/Au) mainly including an Au thin film with a low resistivity. The conductor layer 109 as a ground conductor is formed by a Ti/Au layer and a semiconductor layer including an n+-InGaAs layer, and the metal layer and the semiconductor layer are connected with low-resistance ohmic contact. The dielectric layer 104 is made of benzocyclobutene (BCB of the Dow Chemical Company). The dielectric layer 105 or 106 is formed by $SiO_2$ with a thickness of 1 μm.

As shown in FIG. 7B, on the periphery of the semiconductor layer 100, the conductor layer 109, the semiconductor layer 100, the via 103 formed by a conductor containing Cu, the conductor layer 101, and the conductor layer 111 are stacked in this order from the side of the substrate 110, and are electrically connected. The RTD as the semiconductor layer 100 is arranged at a position shifted from the center of gravity of the conductor layer 101 by 40% (60 μm) of one side of the conductor layer 101 in the resonance direction (that is, the A-A' direction). The input impedance when supplying a high frequency from the RTD to the patch antenna is decided based on the position of the RTD in the antenna. As shown in FIG. 7C, the conductor layer 101 is connected, via the via 107 formed by Cu, to the wiring 108 existing in the same layer as the bias wiring layer 102 arranged on the dielectric layer 105. The wiring layer 102 and the wiring 108 are formed by a metal layer containing Ti/Au stacked on the dielectric layer 105. The wiring 108 is connected to the bias control unit 12 via the bias wiring layer 102 as a common wiring formed in the chip. The active antenna AA is designed to obtain oscillation with power of 0.2 mW at the frequency $f_{THz}$=0.5 THz by setting a bias in the negative resistance region of the RTD included in the semiconductor layer 100.

The varactor diode VD is embedded in the dielectric layer 106, and is connected to the wiring layer 125 formed from a metal layer containing Ti/Au. On the side of the substrate 110, the varactor diode VD is connected to the conductor layer 109 as a GND layer. This applies a desired voltage signal between the diodes. The wiring layer 125 is connected, via the via 124 formed by Cu, to the conductor layer 115 as the upper conductor of the line VL arranged on the dielectric layer 104. In this embodiment, the conductor layer 115 is formed as a wiring in the same layer as the conductor layer 101. The conductor layer 115 is electrically connected to the conductor layer 111 of the coupling line CL by capacitive coupling via silicon nitride. This connection position corresponds to the node (that is, a position at which the electric field of the standing wave of the terahertz wave becomes zero) of the electric field of the standing terahertz wave of the frequency $f_{THz}$ in the coupling line CL. Note that this connection position may be a position different from the node of the electric field of the standing terahertz wave of the frequency $f_{THz}$ in the coupling line CL. The varactor diode VD is connected to the phase control unit 13 via the wiring layer 125. The phase control unit 13 controls a voltage signal to be applied to the varactor diode VD, thereby changing the capacity of the varactor diode VD. This changes impedance of the impedance variable device VZ including the line VL and the varactor diode VD from capacitive to inductive to change the electrical length of the coupling line CL, thereby making it possible to adjust the phase between the active antennas AA to a predetermined value. In this way, an input from the phase control unit 13 arbitrarily changes the phase between the two active antennas connected by the coupling line CL, thereby performing the beamforming operation of the antenna array 11.

Each of the vias 103, 107, and 124 has a columnar structure having a diameter of 10 μm. The wiring 108 is formed by a pattern formed by a metal layer containing Ti/Au and having a width of 10 μm in the resonance direction (that is, the A-A' direction) and a length of 75 μm. The via 107 is at the center in the resonance direction (that is, the A-A' direction), and is connected to the conductor layer 101 at the end of the conductor layer 101 in the C-C' direction. This connection position corresponds to the node of the electric field of the standing terahertz wave of the frequency $f_{THz}$ in the active antenna $AA_1$.

The antenna array 11 is an antenna array in which active antennas are arranged in a matrix. In this embodiment, as an example, the antenna array in which the nine active antennas $AA_1$ to $AA_9$ are arranged in a 3×3 matrix has been described. Each active antenna is designed to singly oscillate the terahertz wave of the frequency $f_{THz}$, and the active antennas are arranged at a pitch (interval) of 340 μm both in the A-A' direction and the B-B' direction. The adjacent antennas are mutually coupled by the coupling line CL including the conductor layer 111 made of Ti/Au, and are mutual injection-locked to oscillate in a state (the positive phase) in which the phases match each other at the oscillation frequency $f_{THz}$=0.5 THz. At this time, the phase control unit 13 controls the impedance variable device VZ, thereby implementing the beamforming operation of the antenna array 11.

(Manufacturing Method)

A manufacturing method (forming method) of the antenna array 11 will be described next.

(1) First, on the substrate 110 made of InP, an InGaAs/AiAs-based semiconductor multilayer film structure forming the semiconductor layer 100 including the RTD is formed by epitaxial growth. A semiconductor stacked structure of n+InGaAs/n-InGaAs/p+InGaAs that forms the varactor diode VD is continuously grown. This is formed by Molecular Beam Epitaxy (MBE), Metal Organic Vapor Phase Epitaxy (MOVPE), or the like.

(2) The semiconductor stacked structure forming the varactor diode VD at a position where the semiconductor layer 100 is arranged is removed by etching. Next, the ohmic electrode Ti/Au layer forming the semiconductor layer 100 and the varactor diode VD is deposited by sputtering.

(3) The semiconductor layer 100 is formed in a mesa structure having a circular shape with a diameter of 2 μm, and the varactor diode VD is formed in a mesa structure having a circular shape with a diameter of 4 μm. To form the mesa shape, photolithography and dry etching are used.

(4) After the conductor layer 109 is formed on the substrate 110, silicon oxide is deposited on the etched surface by a lift-off process to obtain the dielectric layer 106. A Ti/Au layer is formed as a conductor forming the wiring layer 125 on the dielectric layer 106.

(5) Silicon oxide is deposited to obtain the dielectric layer 105. A Ti/Au layer is formed as a conductor forming the wiring layer 102 and the wiring 108 on the dielectric layer 105.

(6) BCB is embedded and planarized using spin coating and dry etching to obtain the dielectric layer 104.

(7) BCB and silicon oxide of the portions forming the vias 103, 107, and 124 are removed by photolithography and dry etching to form via holes (contact holes).

(8) The vias 103, 107, and 124 are formed in the via holes by conductors containing Cu. To form the vias 103, 107, and 124, Cu is embedded in the via holes and planarized using sputtering, electroplating, and chemical mechanical polishing.

(9) An electrode Ti/Au layer is deposited by sputtering to obtain the conductor layer 101 of each antenna and the conductor layer 115 of the line VL. The conductor layers 101 and 115 are patterned by photolithography and dry etching.

(10) Silicon nitride is deposited to obtain a dielectric layer 112. An electrode Ti/Au layer is deposited by sputtering to obtain the conductor layer 111 forming the coupling line CL. The conductor layer 111 is patterned by photolithography and dry etching.

(11) Finally, the resistance layer 127 and the MIM capacitor 126 are formed and connected to the wiring layer 102 and the bias control unit 12 by wire bonding or the like, thereby completing the antenna array 11.

Note that the bias control unit 12 supplies power to the antenna apparatus 10. Normally, if a bias voltage is applied to supply a bias current in the negative differential resistance region, the antenna apparatus 10 operates as an oscillator.

Second Embodiment

Figure 2A:
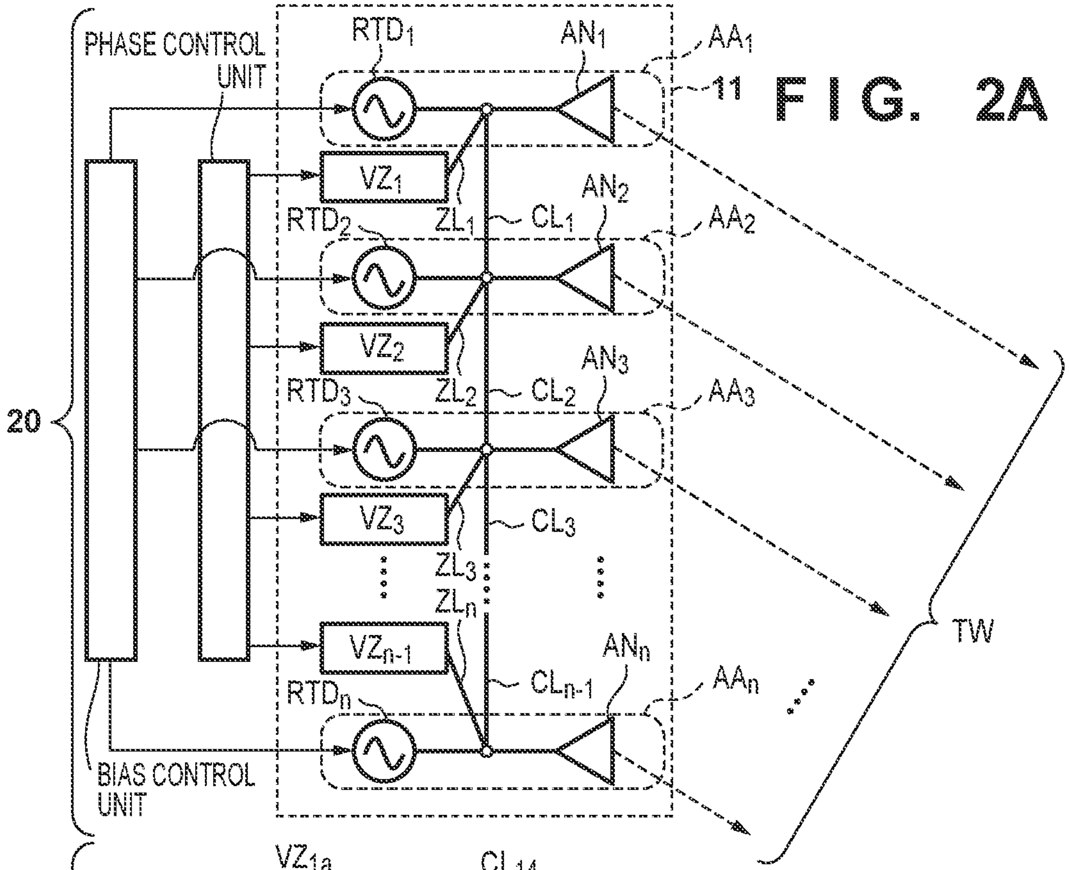
FIG. 2A is a block diagram showing an antenna apparatus 20.
Figure 2B:
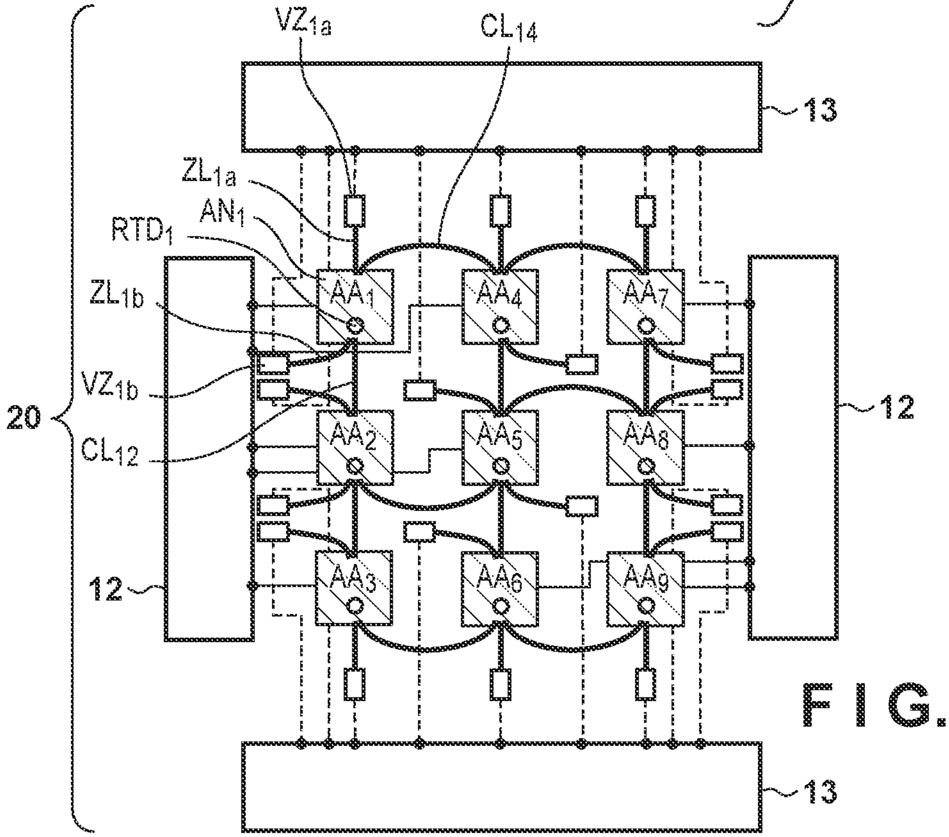
FIG. 2B is a schematic plan view showing an embodiment of the antenna apparatus 20.

Subsequently, the arrangement of an antenna apparatus 20 according to the second embodiment will be described with reference to FIGS. 2A and 2B. FIG. 2A is a block diagram for explaining the system configuration of the antenna apparatus 20, and FIG. 2B is a schematic plan view showing the schematic arrangement of the antenna apparatus 20 when viewed from above. Note that in FIGS. 2A and 2B, the same components as those of the antenna apparatus 10 of the first embodiment will not be described. As shown in FIG. 2A, the antenna apparatus 20 includes an antenna array 11 in which n active antennas $AA_1$ to $AA_n$ have impedance variable devices $VZ_1$ to $VZ_n$, respectively. The adjacent antennas $AA_1$ to $AA_n$ are electrically connected by coupling lines $CL_1$ to $CL_{n-1}$, respectively, similar to the antenna apparatus 10 of the first embodiment, and the antennas are synchronized with each other by a mutual injection locking phenomenon at a frequency $f_{THz}$. The impedance variable devices $VZ_1$ to $VZ_n$ are connected to the end portions of transmission lines $ZL_1$ to $ZL_n$, respectively, and other end portions of the transmission lines $ZL_1$ to $ZL_n$ are connected to the active antennas $AA_1$ to $AA_n$, respectively. Lines having the same structure are used for the coupling lines $CL_1$ to $CL_{n-1}$ and the transmission lines $ZL_1$ to $ZL_n$ but the arrangement is different from the first embodiment in that the transmission lines $ZL_1$ to $ZL_n$ do not connect the adjacent antennas. That is, it can be said that the impedance variable devices $VZ_1$ to $VZ_n$ are connected to the open ends of the transmission lines $ZL_1$ to $ZL_n$, respectively. Note that the numeral n of the transmission line $ZL_n$ corresponds to the numeral n of the active antenna $AA_n$.

In the example of the 3×3 array shown in FIG. 2B, a coupling line $CL_{14}$ for establishing synchronization in the horizontal direction between the active antennas $AA_1$ and $AA_4$ and a coupling line $CL_{12}$ for establishing synchronization in the vertical direction between the active antennas $AA_1$ and $AA_2$ are arranged. The impedance variable device is provided for each of the active antennas $AA_1$ to $AA_9$. For example, transmission lines $ZL_{1a}$ and $ZL_{1b}$ whose end portions are connected to impedance variable devices $VZ_{1a}$ and $VZ_{1b}$, respectively, are connected to the active antenna $AA_1$. In this case, it can be considered that the transmission line $ZL_{1a}$ and the impedance variable device $VZ_{1a}$ form a circuit corresponding to a half of the coupling line $CL_{12}$ described with reference to FIG. 5A, that is, a circuit from a port 1 to a port 3 and the impedance variable device $VZ_{12}$, and this circuit is connected to the active antenna $AA_1$. Similar to the antenna apparatus 20, by adjusting, by the impedance variable devices $VZ_1$ to $VZ_n$, the impedances of the terminations of the transmission lines connected to the antennas, it is possible to modulate the synchronization state among the active antennas $AA_1$ to $AA_n$.

Figure 8A:
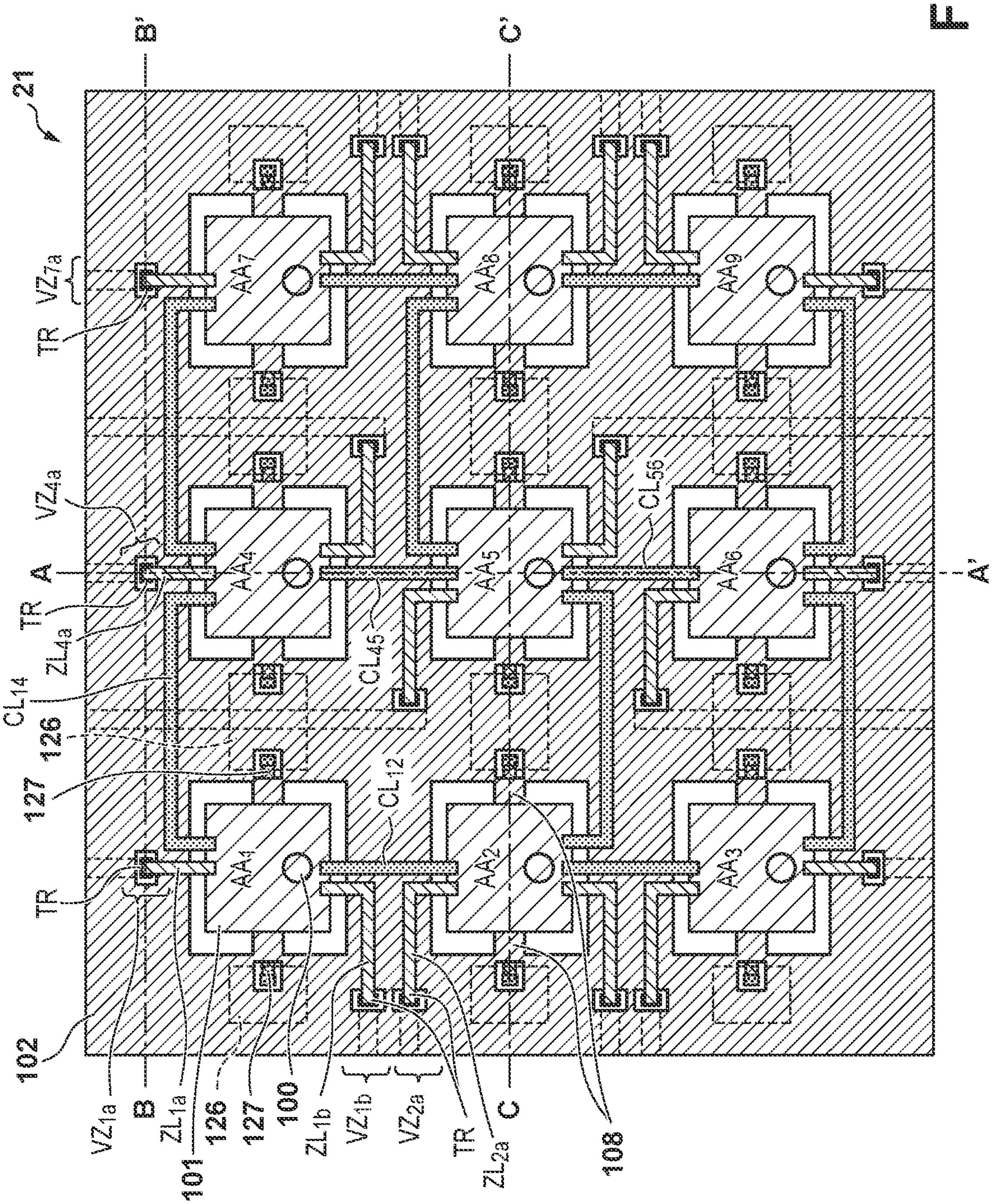
FIG. 8A is a plan view of the second example of an antenna array.
Figure 8B:
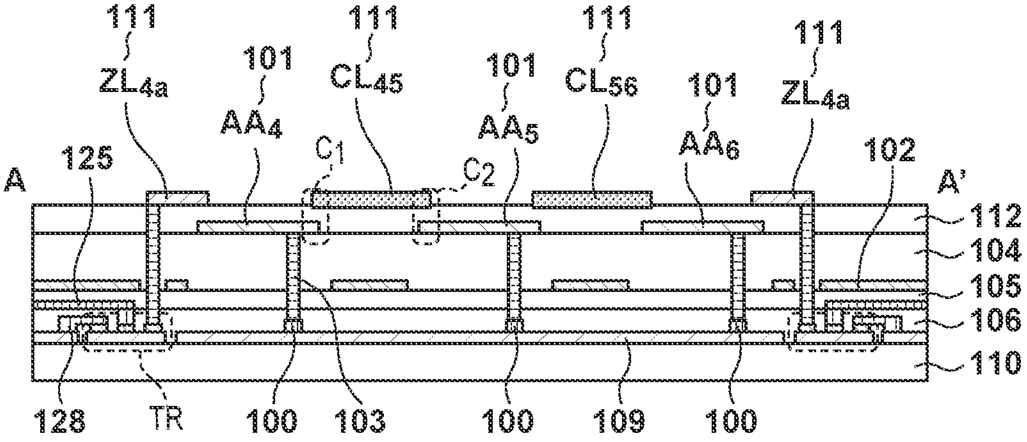
FIGS. 8B to 8D are sectional views of the second example of the antenna array.
Figure 8C:
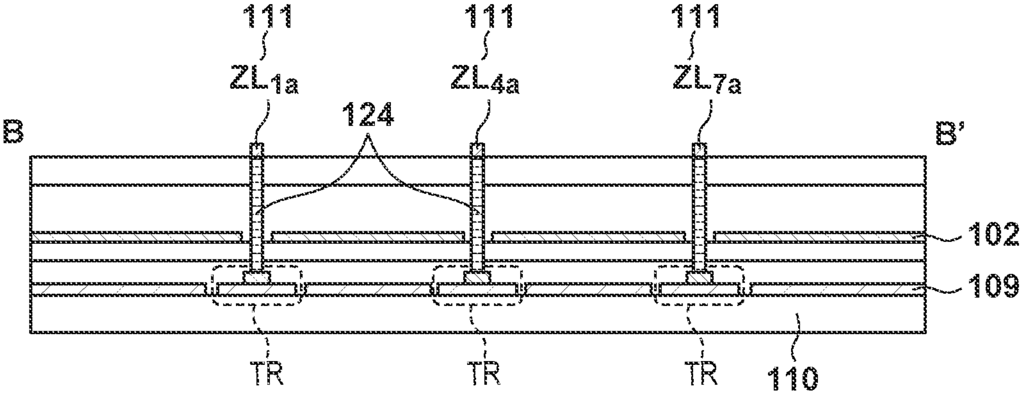
Figure 8D:
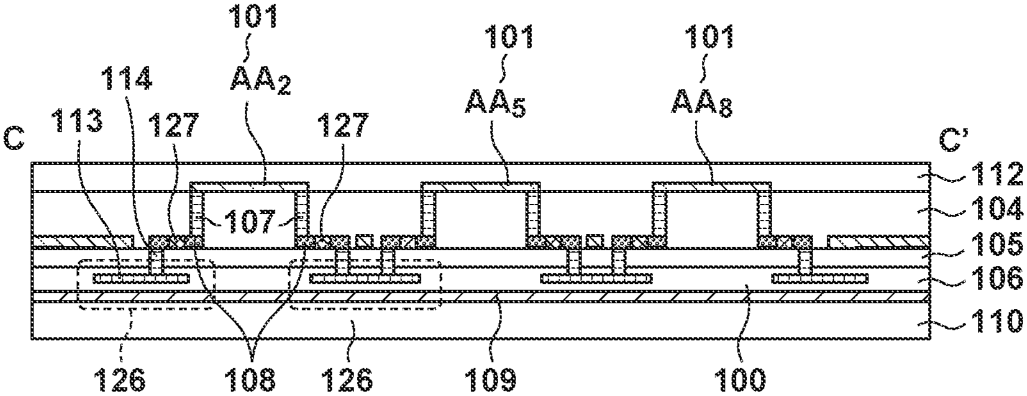

A practical example of the arrangement of an antenna array 21 in the antenna apparatus 20 shown in FIGS. 2A and 2B will be described with reference to FIGS. 8A to 8D. FIG. 8A shows a plan view of the antenna array 21 in the arrangement of this example, and FIGS. 8B to 8D show schematic sectional views of the antenna array 21. Note that components and structures other than those in the antenna array 21 to be described below are the same as those in the antenna array 11 of the antenna apparatus 10 described in the first embodiment and a detailed description thereof will be omitted.

As shown in FIG. 8A, in the antenna array 21, the transmission line ZL that connects each antenna and the impedance variable device VZ is provided separately from the coupling line CL for establishing synchronization among the active antennas $AA_1$ to $AA_9$ described with respect to the antenna apparatus 10. In an example, as a transistor TR of the impedance variable device VZ, an InGaAs/InAlAs-based high electron mobility transistor (HEMT) that can be integrated with the InP-based RTD is used. In this case, an epitaxial substrate obtained by stacking an HEMT layer and an RTD layer on a semi-insulating InP substrate as a substrate 110 in this order is used. Note that the HEMT layer includes i-InAlAs buffer layer/i-InGaAs channel layer/n+InAlAs electron supply layer/i-InAlAs barrier layer/InGaAs cap layer. In this embodiment, with respect to a location where the transistor TR is arranged, the HEMT layer is exposed by removing the RTD layer of the surface layer by etching, and then used. In this embodiment, as the transistor TR, the HEMT having a gate length of 0.1 μm and a gate width of 10 μm is used. As shown in FIG. 8B, in the transistor TR, the source is connected to the end portion of the transmission line ZL via a via 124, the emitter side is connected to a conductor layer 109 as GND via a conductor layer 128, and the gate is connected to a wiring layer 125 for phase control. At this time, a circuit of the transmission line ZL and the transistor TR is a circuit corresponding to a half of the coupling line CL shown in FIG. 6A, that is, a circuit corresponding to a portion of port 1-port 3-VZ. This arrangement can adjust the state of the termination of the transmission line ZL connected to the antenna from the short circuit to the release, thereby appropriately modulating the synchronization state among the active antennas $AA_1$ to $AA_n$.

Figure 3A:
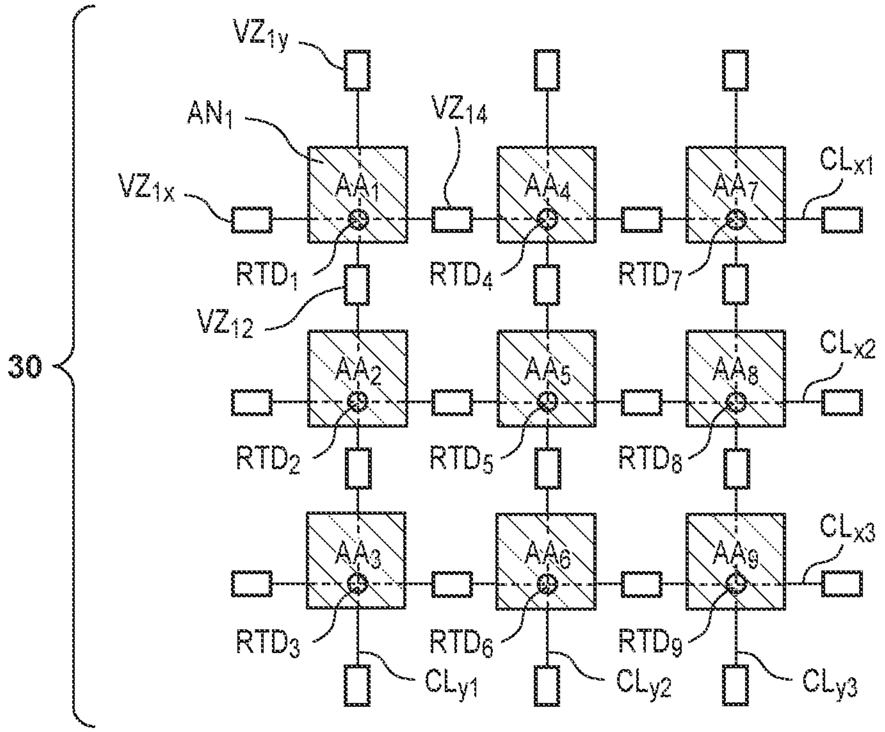
FIG. 3A is a schematic plan view showing an antenna apparatus 30.
Figure 4A:
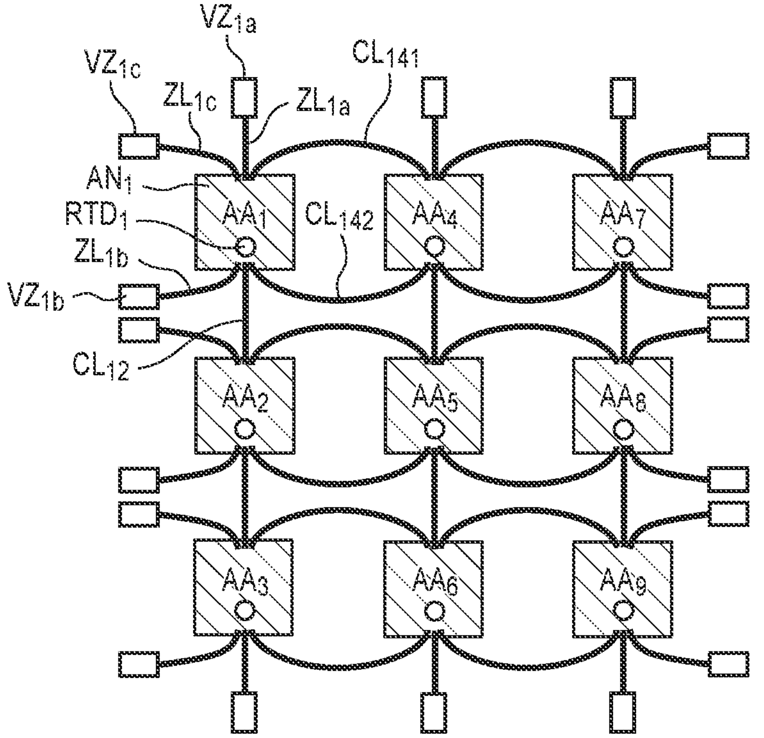
FIG. 4A is a schematic plan view showing an antenna apparatus 50.
Figure 4B:
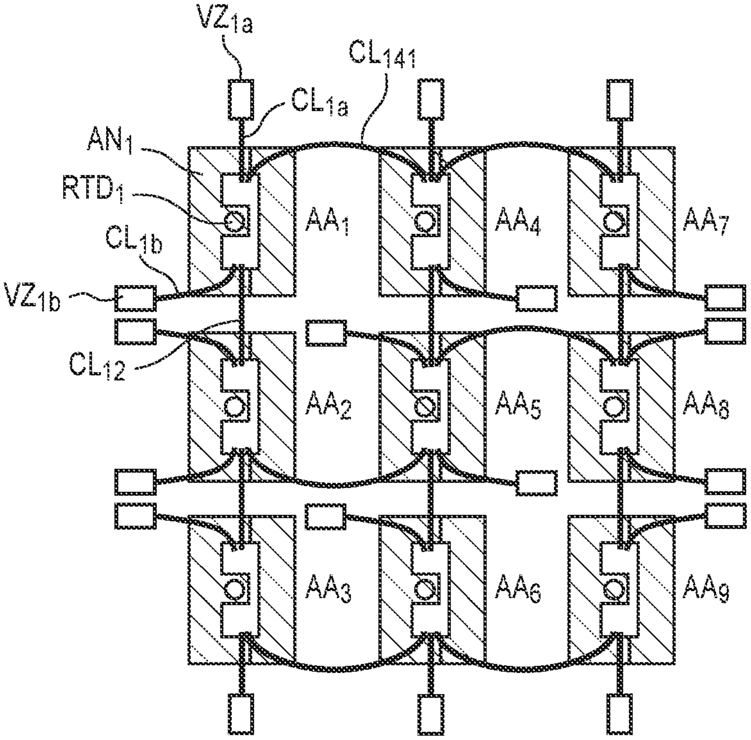
FIG. 4B is a schematic plan view showing an antenna apparatus 60.

FIGS. 3A, 4A, and 4B show schematic plan views of modifications of this embodiment. An antenna apparatus 30 shown in FIG. 3A includes three coupling lines $CL_{x1}$ to $CL_{x3}$ in the horizontal direction and three coupling lines $CL_{y1}$ to $CL_{y3}$ in the vertical direction. The respective coupling lines are physically, directly connected to semiconductor layers $RTD_1$ to $RTD_9$ to synchronize the active antennas $AA_1$ to $AA_9$ with each other. For example, the semiconductor layer $RTD_1$ of the active antenna $AA_1$ is connected to the coupling line $CL_{x1}$ in the horizontal direction and to the coupling line $CL_{y1}$ in the vertical direction, and is connected to four impedance variable device $VZ_{1x}$, $VZ_{1y}$, $VZ_{12}$, and $VZ_{14}$ on the right, left, upper, and lower sides. This arrangement can implement high phase controllability by strong coupling among the semiconductor layers $RTD_1$ to $RTD_9$. Furthermore, as shown in FIG. 4A, the impedance variable devices VZ may be vertically and horizontally, symmetrically arranged. As shown in FIG. 4B, a slot antenna may be used for each active antenna. These arrangements can improve the directivity characteristic.

Third Embodiment

Figure 3B:
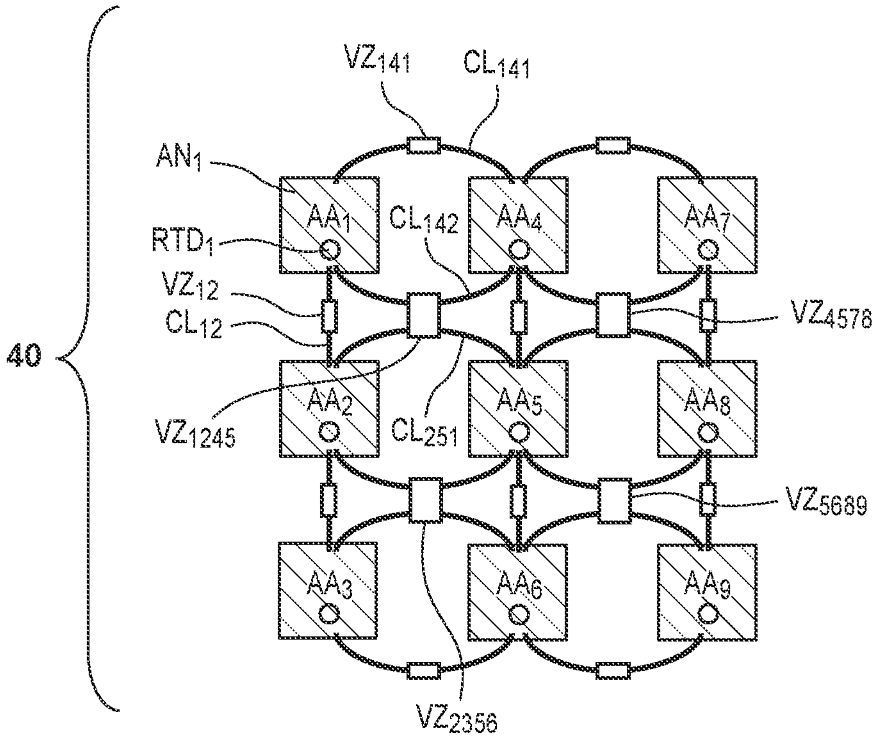
FIG. 3B is a schematic plan view showing an antenna apparatus 40.
Figure 6E:
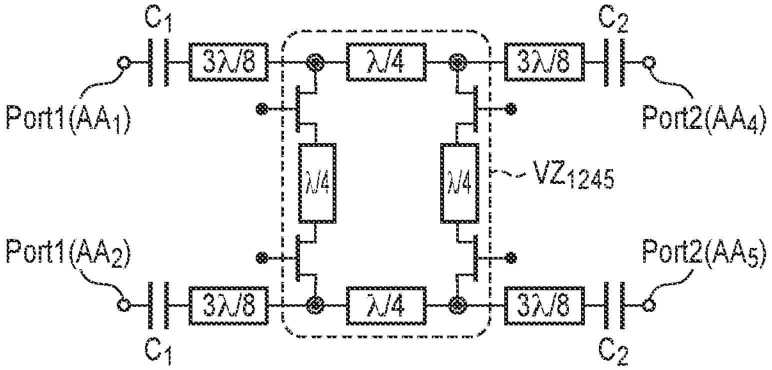
Figure 6F:
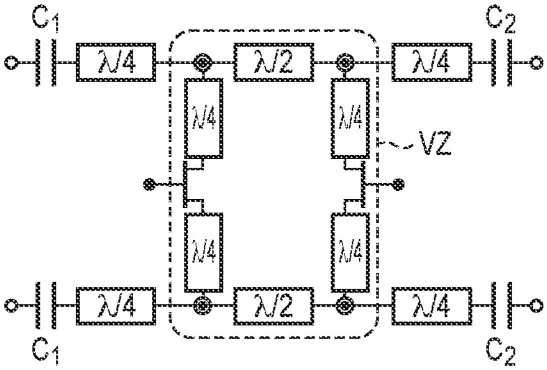

An antenna apparatus 40 shown in FIG. 3B is an example of using a hybrid coupler shown in FIG. 6E or 6F as an impedance variable device. The antenna apparatus 40 includes four hybrid couplers $VZ_{1245}$, $VZ_{2356}$, $VZ_{4578}$, and $VZ_{5689}$, each of which connects the adjacent active antennas of a 2×2 array. For example, active antennas $AA_1$, $AA_2$, $AA_4$, and $AA_5$ are connected to the hybrid coupler $VZ_{1245}$ arranged at the intermediate point between two coupling lines $CL_{142}$ and $CL_{251}$. The remaining components are similar to those of the above-described antenna apparatus 10. The hybrid coupler $VZ_{1245}$ is a circuit shown in a circuit diagram of FIG. 6E, and is formed from four switches and two λ/4 lines that bypass-connect the coupling lines $CL_{142}$ and $CL_{251}$ as X, lines. It is possible to generate a phase difference between ports by switching ON/OFF of the switches to control multiplexing in the hybrid coupler $VZ_{1245}$.

Figure 9A:
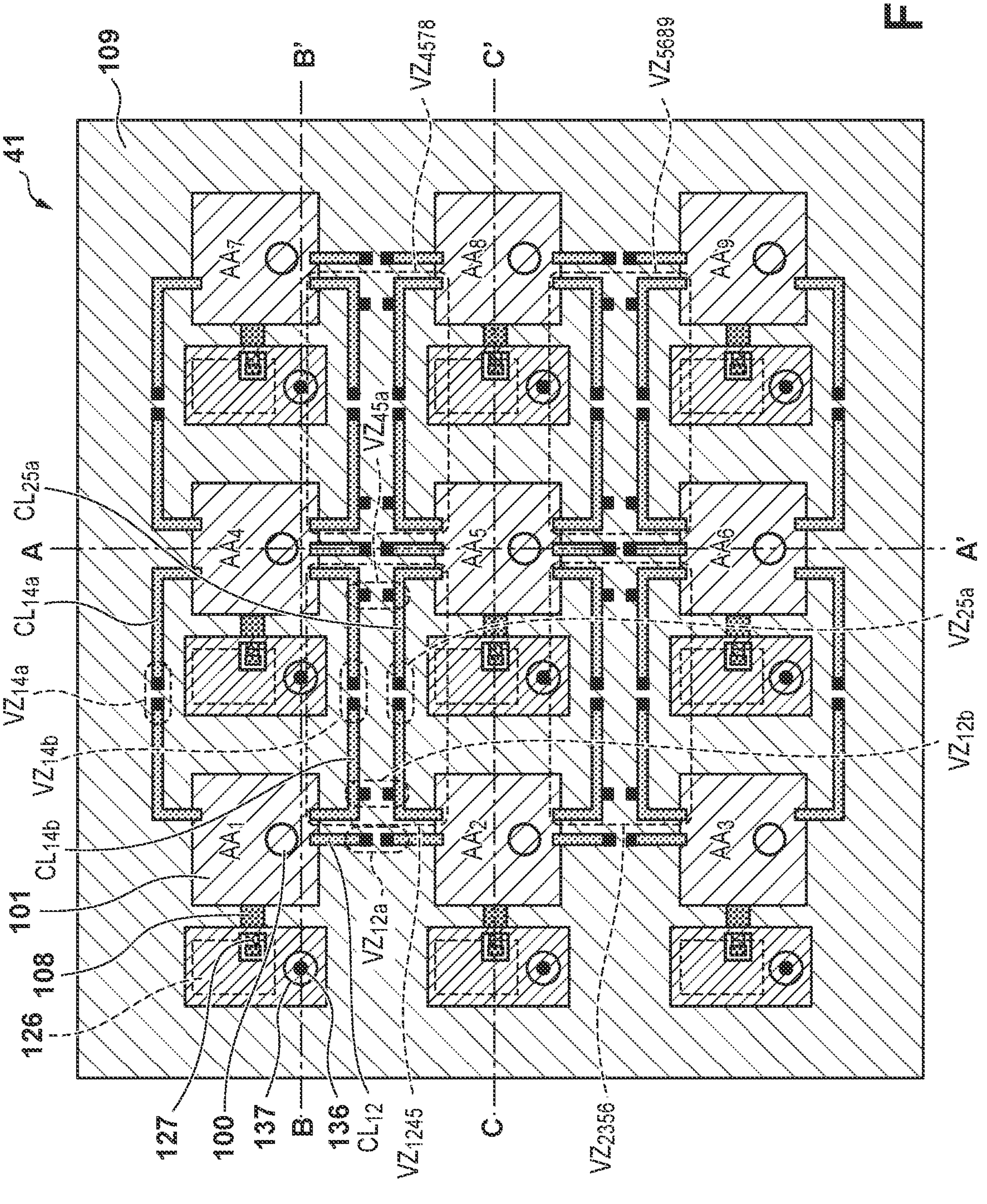
FIG. 9A is a plan view of the third example of an antenna array.
Figure 9B:
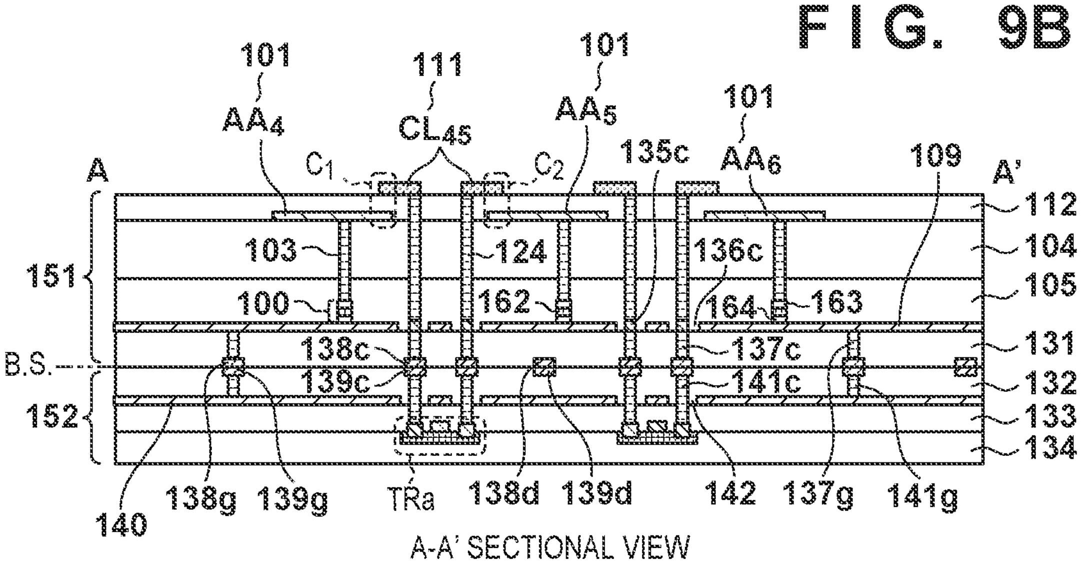
FIGS. 9B to 9D are sectional views of the third example of the antenna array.
Figure 9C:
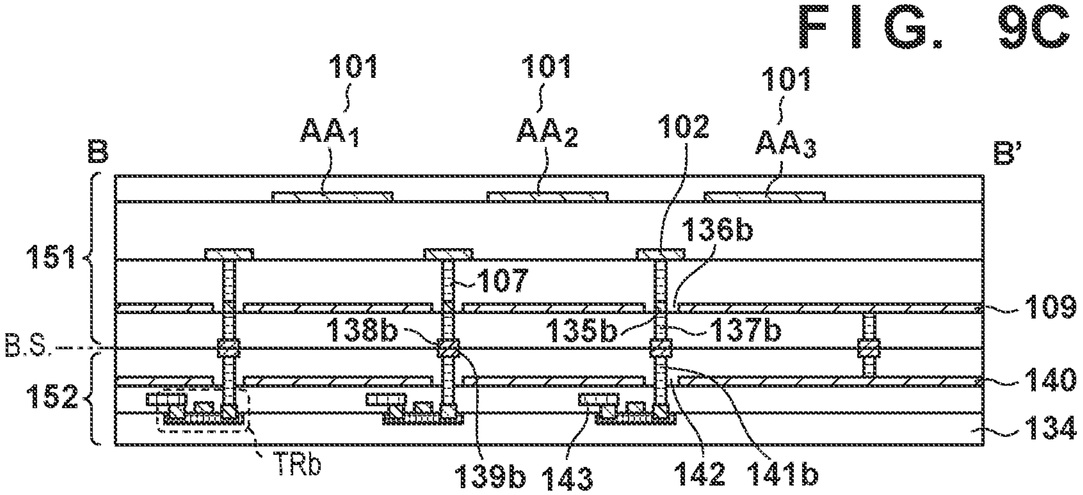
Figure 9D:
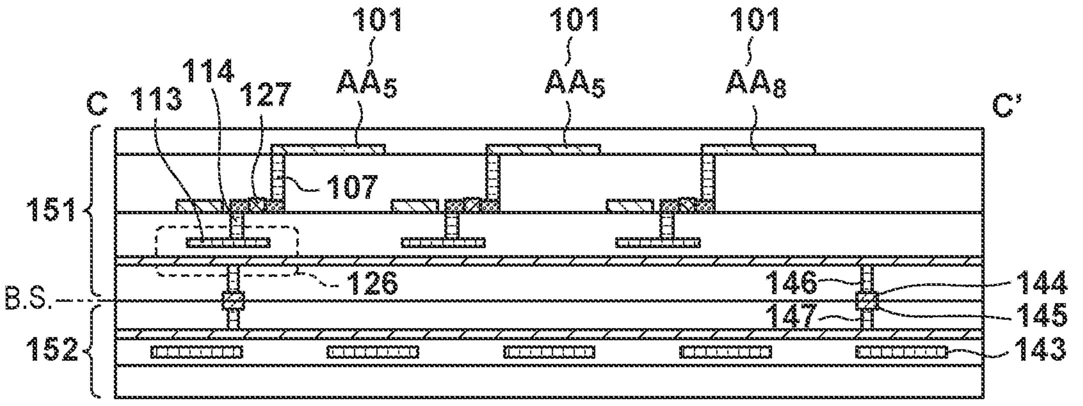

A practical example of the arrangement of an antenna array 41 of the antenna apparatus 40 according to the third embodiment shown in FIG. 3B will be described with reference to FIGS. 9A to 9D. FIG. 9A shows a plan view of the antenna array 41 and FIGS. 9B to 9D show schematic sectional views of the antenna array 41. Note that among the components of the antenna array 41, the components described with respect to the antenna apparatus 10 in the first embodiment are denoted by the same reference numerals and a detailed description thereof will be omitted.

The active antenna array 41 shown in FIG. 9A uses a hybrid coupler shown in FIG. 6E as an impedance variable device, as described above. The antenna array 41 includes the four hybrid couplers $VZ_{1245}$, $VZ_{2356}$, $VZ_{4578}$, and $VZ_{5689}$, each of which connects the adjacent active antennas of the 2×2 array. For example, the active antennas $AA_1$, $AA_2$, $AA_4$, and $AA_5$ are connected to the hybrid coupler $VZ_{1245}$ arranged at the intermediate point between two coupling lines $CL_{14b}$ and $CL_{25a}$. The hybrid coupler $VZ_{1245}$ is formed from four impedance variable devices $VZ_{12b}$, $VZ_{45a}$, $VZ_{14b}$, and $VZ_{25a}$. Among them, the impedance variable devices $VZ_{12b}$ and $VZ_{45a}$ are connected to couple the two coupling lines $CL_{14b}$ and $CL_{25a}$ in the vertical direction, and switch the coupling between the coupling lines $CL_{14b}$ and $CL_{25a}$ by ON/OFF switches. Furthermore, the impedance variable device $VZ_{14b}$ is arranged at the intermediate point of the coupling line $CL_{14b}$, and the impedance variable device $VZ_{25a}$ is arranged at the intermediate point of the coupling line $CL_{25a}$, thereby serving as switches for switching the coupling between the adjacent antennas. It is possible to generate a phase difference between ports by controlling multiplexing in the hybrid coupler $VZ_{1245}$.

In this embodiment, as the impedance variable device VZ, a MOSFET advantageous in circuit integration and a reduction in cost is used. In this embodiment, as shown in FIGS. 9B to 9D, a first substrate 151 on which an antenna array for transmitting/receiving a terahertz wave and a semiconductor layer 100 formed from a compound semiconductor are integrated and a second substrate 152 including a CMOS integrated circuit for antenna array control are bonded at a bonding surface B.S. This arrangement is implemented by stacking, by a semiconductor stacking technique, an antenna substrate of a compound semiconductor including an antenna array and an Si integrated circuit substrate. In this embodiment, the semiconductor layer 100 will be sometimes referred to as the "compound semiconductor layer 100" hereinafter.

As shown in FIG. 9B, in the semiconductor layer 100, a lower electrode layer 164, a semiconductor structure 162, and an upper electrode layer 163 are stacked in this order from the side of a conductor layer 109, and are electrically connected. The semiconductor structure 162 is a semiconductor structure having nonlinearity and an electromagnetic wave gain with respect to a terahertz wave, and an RTD is used in this embodiment. The upper electrode layer 163 and the lower electrode layer 164 have a structure serving as an electrode layer for connecting contact electrodes (ohmic and Schottky electrodes) above and below the semiconductor structure 162 and upper and lower wiring layers in order to apply a potential difference or a current to the semiconductor structure 162. The upper electrode layer 163 and the lower electrode layer 164 can be made of a metal material (Ti/Pd/Au/Cr/Pt/AuGe/Ni/TiW/Mo/ErAs or the like) known as an ohmic electrode or Schottky electrode, or a semiconductor doped with impurities.

One active antenna AA is formed from a conductor layer 101 of the antenna, the semiconductor layer 100, the conductor layer 109 (reflector), dielectric layers 104 and 105, and a via 103 that connects the conductor layer 101 and the semiconductor layer 100. To apply a control signal to the semiconductor layer 100, a bias wiring layer 102, a via 107, a MIM capacitor 126, and a resistance layer 127, which are individually provided for each active antenna, are connected to the active antenna AA, as shown in FIGS. 9C and 9D. The MIM capacitor 126 is a capacitive element that sandwiches an insulating layer by metal elements, and is arranged to suppress a low-frequency parasitic oscillation caused by a bias circuit. The active antennas $AA_1$ to $AA_9$ are connected by the coupling lines CL for establishing synchronization between the antennas at a terahertz frequency.

The bonding surface B.S. is provided on the lower surface of the first substrate 151 on which the antenna array and the compound semiconductor are integrated, and the first substrate 151 is bonded, via the bonding surface B.S., to the second substrate 152 including the integrated circuit. At this time, "bonded" is defined as sharing the same bonding surface B.S. by the first substrate 151 and the second substrate 152. The bonding second substrate 152 is formed by including the second semiconductor substrate as a base material and an integrated circuit region where a driving circuit is formed. The first substrates 151 and the second substrate 152 are bonded by metal bonding such as Cu—Cu bonding, insulator bonding such as $SiO_x$—$SiO_x$ bonding, hybrid bonding as a combination of these, or the like. In addition, adhesive bonding using an adhesive such as BCB, or another bonding may be used. An arbitrary combination of a plurality of bonding processes such as a combination of metal bonding and adhesive bonding, a combination of insulator bonding and adhesive bonding, a combination of metal bonding, insulator bonding, and adhesive bonding, or a combination of metal bonding and another bonding can be applied. As a bonding process, low-temperature bonding using plasma activation or conventional thermocompression bonding is used. A method of bonding semiconductor wafers of the same size, a method of bonding semiconductor wafers of different sizes, a method (tiling) of separately bonding a plurality of semiconductor chips to a wafer, or the like is used. The first substrate 151 and the second substrate 152 can be different types of substrates made of different materials. In this case, the different types of substrates are bonded.

In the antenna array 41, the mesa structure of the compound semiconductor layer 100 is embedded in the dielectric layer 105 to cover the periphery. The surface of the dielectric layer 105 on the side of the bonding surface B.S. is planarized, and the conductor layer 109 as a reflector is provided on the planarized surface. The dielectric layer 105 plays the role as a dielectric material forming the antenna and the role of a planarization film in a manufacturing process of transferring the mesa structure of the compound semiconductor layer 100 to the different type of substrate. As the dielectric layer 105, for example, an inorganic insulating material such as silicon oxide (SiOx), silicon nitride (SiNx), silicon oxynitride (SiON), carbon-containing silicon oxide (SiOC), or silicon carbide (SiC) is used.

On the side of the first substrate 151 opposite to the second substrate 152, the conductor layer 109, the dielectric layer 105, the dielectric layer 104, and a dielectric layer 112 are stacked in this order. In the dielectric layers 105 and 104, the via 103, the via 107, and a via 124, and the conductor layer 101, the conductor layer 102, and a conductor layer 111 respectively connected to the vias are formed. On the planarized surface of the dielectric layer 105 of the first substrate 151 on the side of the second substrate 152, the conductor layer 109 and an insulating layer 131 are stacked in this order, and a through via 137 and a bonding electrode layer 138 are formed in the insulating layer 131. The insulating layer 131 and the electrode layer 138 are planarized at the bonding surface B.S., and undergoes a bonding process in a state in which the flat bonding surface B.S. is exposed. In the second substrate 152, a second semiconductor substrate 134 as a base material, an insulating layer 133, a conductor layer 140, and an insulating layer 132 are stacked in this order, and a via 141 and a bonding electrode layer 139 are formed in the insulating layer 132. The insulating layer 132 and the electrode layer 139 are planarized at the bonding surface B.S., and undergoes a bonding process in a state in which the flat bonding surface B.S. is exposed. The insulating layers 131 to 134 can be formed using an inorganic insulating material such as silicon oxide ($SiO_x$), silicon nitride ($SiN_x$), silicon oxynitride (SiON), carbon-containing silicon oxide (SiOC), or silicon carbide (SiC).

FIG. 9B is a sectional view of the antenna array 41 taken along a line A-A'. The coupling line CL of the first substrate 151 on which the compound semiconductor is integrated and the conductor layer 109 as a reflector are electrically connected to a transistor TRa (MOSFET) for phase control arranged in the integrated circuit region of the second substrate 152 and the GND layer 140. The conductor layer 111 as the upper conductor of the coupling line CL of the first substrate 151 is connected to the via 124 formed in the dielectric layers 104 and 105, and a wiring layer 135*c* provided in an opening 136*c* of the dielectric layer 104. Furthermore, the wiring layer 135*c* is electrically connected to a through via 137*c* provided in the insulating layer 131, and a bonding electrode layer 138*c* in this order. With this arrangement, the conductor layer 111 reaches the bonding surface B.S. In addition, a transistor TR formed in the integrated circuit region of the second substrate 152 is connected to a via 141*c* formed in the integrated circuit region, and a bonding electrode layer 139*c* in this order to reach the bonding surface B.S. The electrode layer 138*c* of the first substrate 151 and the electrode layer 139*c* of the second substrate 152 are electrically connected at the bonding surface B.S. to render the coupling line CL of the antenna array and the transistor TRa of an integrated circuit region 154 conductive, thereby making it possible to apply a control signal. Note that the transistor TRa and a transistor TRb are formed near the surface of the second semiconductor substrate 134 as the base material of the second substrate 152.

Similarly, the conductor layer 109 as a reflector in the antenna of the first substrate 151 is electrically connected to a via 137*g* provided in the insulating layer 131, and a bonding electrode layer 138*g* in this order to reach the bonding surface B.S. The conductor layer 140 as GND of the second substrate 152 is connected to a via 141*g* formed in the insulating layer 132 and a bonding electrode layer 139*g* in this order to reach the bonding surface B.S. The electrode layer 138*g* of the first substrate 151 and the electrode layer 139*g* of the second substrate 152 are electrically connected at the bonding surface B.S., thereby sharing the GND potential of both the substrates. As an example of enhancing the bonding strength, dummy electrode layers 138*d* and 139*d* not connected to signal lines may be provided on the bonding surface B.S. By widely distributing the dummy electrode layers 138*d* and 139*d* in a region where no wiring electrode is necessary, the bonding strength can be enhanced, thereby improving the yield and reliability. Furthermore, by widely distributing and arranging the GND electrode layers 138*g* and 139*g* and the dummy electrode layers 138*d* and 139*d* over the entire bonding surface B.S., it is possible to reduce the influence of electromagnetic wave noise on the terahertz antennas of the first substrate 151, which is caused by the integrated circuit of the second substrate 152.

FIG. 9C is a sectional view of the antenna array 41 taken along a line B-B'. The bias wiring layer 102 connected to the compound semiconductor layer of the first substrate 151 is electrically connected to the transistor TRb (MOSFET) for bias control provided in the integrated circuit region of the second substrate 152. The bias wiring layer 102 of the first substrate 151 is electrically connected to the via 107 formed in the dielectric layer 105, a wiring layer 135*b* provided in an opening 136*b* of the conductor layer 109 as a reflector, a through via 137*b* provided in the insulating layer 131, and the bonding electrode layer 138*b* in this order. Thus, the wiring layer 102 reaches the bonding surface B.S. Similarly, the transistor TRb formed in the integrated circuit region of the second substrate 152 is connected to a via 141*b* formed in the integrated circuit region, and a bonding electrode layer 139*b* in this order to reach the bonding surface B.S. The electrode layer 138*b* of the first substrate 151 and the electrode layer 139*b* of the second substrate 152 are electrically connected at the bonding surface B.S. Therefore, the bias wiring layer 102 of the antenna array and the transistor TRa of the integrated circuit region are rendered conductive, thereby making it possible to individually apply a control signal to each antenna.

The transistor TRa for phase control adjusts the impedance of the coupling line CL by a variable resistance or a switch operation by connecting the source-drain path of the MOSFET to the intermediate point of the coupling line CL. The transistor TRa for phase control can be used as a variable capacitor by connecting the gate-source path. The MOSFET of the transistor TRa for bias control also serves as a bias control unit, and operates as a switching regulator to supply a bias signal to the compound semiconductor layer 100. As another arrangement, an arrangement in which a voltage is supplied from the outside of the second substrate 152 by additionally providing a terminal for applying a bias signal on the second substrate 152 and causing the transistor TRa to operate as an analog switch may be adopted.

In the active antenna array of the terahertz wave, to individually control each antenna, a plurality of wirings such as a bias line for supplying power to the compound semiconductor, a synchronization line for controlling synchronization between the antennas, and a control line for injecting a baseband signal into the antenna are necessary. On the other hand, to improve the gain of the antenna, it is necessary to increase the number of antennas but wiring inductance caused by the layout increases along with an increase in number of antennas, thereby interfering with implementation of a high frequency. To the contrary, in this embodiment, the antenna substrate (first substrate 151) of the compound semiconductor including the antenna array and the Si integrated circuit substrate 152 are stacked by a semiconductor bonding technique. This eliminates the need to take an implementation form of integrating or externally connecting a peripheral circuit necessary to control the active antenna array onto the compound semiconductor substrate. This can suppress an increase in inductance caused by wiring routing, and typically suppress inductance to 1 nH or less, thereby suppressing a signal loss or signal delay of the baseband signal subjected to modulation control at a high frequency of 1 GHz or more.

Since, on the periphery of the antenna, there is no circuit that is not related to transmission/reception of the terahertz wave or the number of such circuits can be made sufficiently small, noise by unnecessary reflection is reduced, thereby making it possible to exhibit the characteristic of the antenna at the maximum. If the bias signal of the compound semiconductor and the like are controlled for each antenna, each bias wiring needs to be individually arranged. To the contrary, in this embodiment, the first substrate 151 including the antenna array can directly be connected to the integrated circuit of the second substrate 152 via the through vias 137*b*, 137*c*, 137*d*, and 137*g*. If the antenna array is used, a wiring can be arranged on the rear side (that is, the rear side of the conductor layer 109 as a reflector) of the antenna substrate (first substrate 151) of the compound semiconductor including the antenna array. Therefore, it is possible to increase the number of active antennas included in the antenna array without receiving the influence of the layout. Furthermore, the second substrate 152 including the integrated circuit can form a complex circuit such as a detection circuit or a signal processing circuit using the conventional CMOS integrated circuit technique. Therefore, by using the arrangement described in this embodiment, it is possible to sophisticate the antenna apparatus and reduce the cost, and thus readily use an electromagnetic wave in the terahertz band.

Fourth Embodiment

Figure 10A:
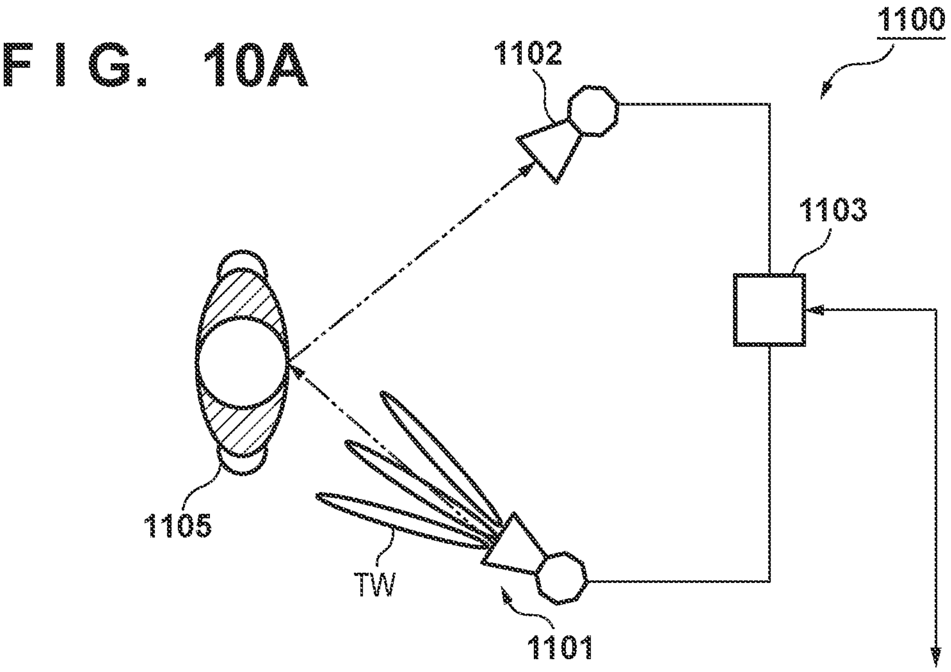
FIG. 10A is a view showing a camera system using an antenna apparatus.

This embodiment will describe a case in which the antenna apparatus of one of the above-described embodiments is applied to a terahertz camera system (image capturing system). The following description will be provided with reference to FIG. 10A. A terahertz camera system 1100 includes a transmission unit 1101 that emits a terahertz wave, and a reception unit 1102 that detects the terahertz wave. Furthermore, the terahertz camera system 1100 includes a control unit 1103 that controls the operations of the transmission unit 1101 and the reception unit 1102 based on an external signal, processes an image based on the detected terahertz wave, or outputs an image to the outside. The antenna apparatus of each embodiment may serve as the transmission unit 1101 or the reception unit 1102.

The terahertz wave emitted from the transmission unit 1101 is reflected by an object 1105, and detected by the reception unit 1102. The camera system including the transmission unit 1101 and the reception unit 1102 can also be called an active camera system. Note that in a passive camera system without including the transmission unit 1101, the antenna apparatus of each of the above-described embodiments can be used as the reception unit 1102.

By using the antenna apparatus of each of the above-described embodiments that can perform beamforming, it is possible to improve the detection sensitivity of the camera system, thereby obtaining a high quality image.

Fifth Embodiment

Figure 10B:
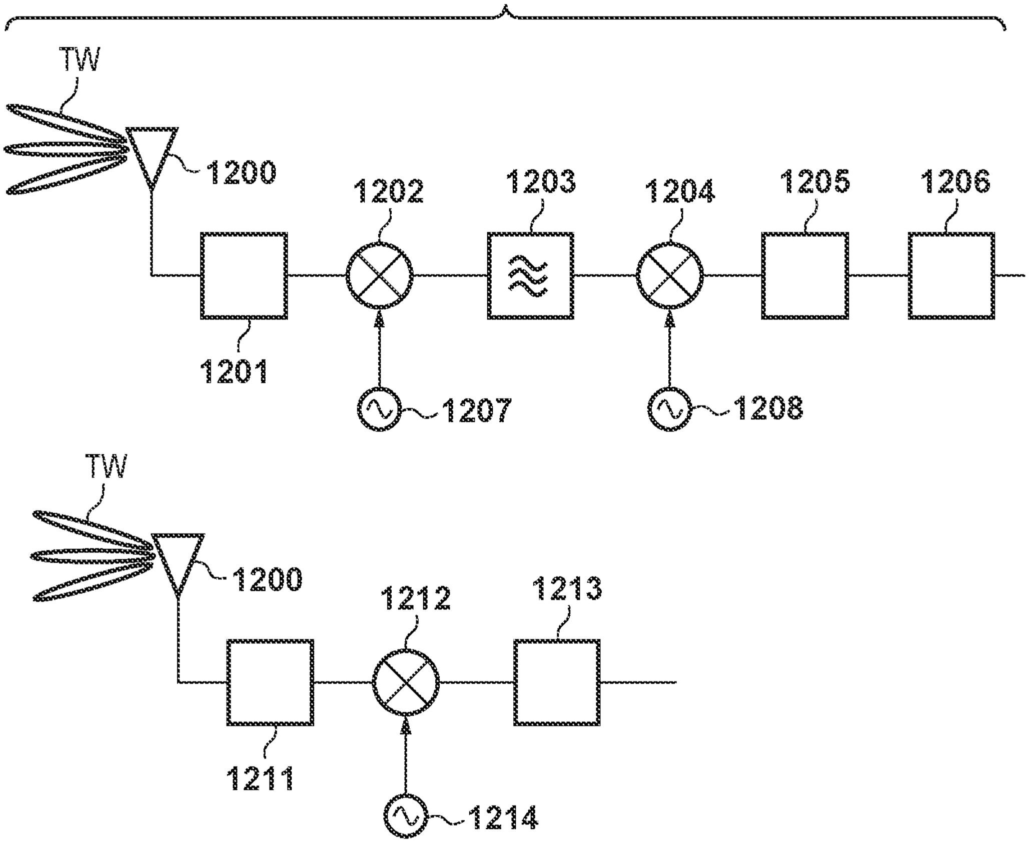
FIG. 10B is a view showing an example of the arrangement of a communication system using an antenna apparatus.

This embodiment will describe a case in which the antenna apparatus of one of the above-described embodiments is applied to a terahertz communication system (communication apparatus). The following description will be provided with reference to FIG. 10B. The antenna apparatus can be used as an antenna 1200 of the communication system. As the communication system, the simple ASK method, superheterodyne method, direct conversion method, or the like is assumed. The communication system using the superheterodyne method includes, for example, the antenna 1200, an amplifier 1201, a mixer 1202, a filter 1203, a mixer 1204, a converter 1205, a digital baseband modulator-demodulator 1206, and local oscillators 1207 and 1208. In the case of a receiver, a terahertz wave received via the antenna 1200 is converted into a signal of an intermediate frequency by the mixer 1202, and is then converted into a baseband signal by the mixer 1204, and an analog waveform is converted into a digital waveform by the converter 1205. After that, the digital waveform is demodulated in the baseband to obtain a communication signal. In the case of a transmitter, after a communication signal is modulated, the communication signal is converted from a digital waveform into an analog waveform by the converter 1205, is frequency-converted via the mixers 1204 and 1202, and is then output as a terahertz wave from the antenna 1200. The communication system using the direct conversion method includes the antenna 1200, an amplifier 1211, a mixer 1212, a modulator-demodulator 1213, and a local oscillator 1214. In the direct conversion method, the mixer 1212 directly converts the received terahertz wave into a baseband signal at the time of reception, and the mixer 1212 converts the baseband signal to be transmitted into a signal in a terahertz band at the time of transmission. The remaining components are similar to those in the superheterodyne method. The antenna apparatus according to each of the above-described embodiments can perform beamforming of a terahertz wave by electric control of a single chip. Therefore, it is possible to align radio waves between the transmitter and the receiver. By using the antenna apparatus of each of the above-described embodiments that can perform beamforming, in the communication system, it is possible to improve radio quality such as a signal-to-noise ratio, and transmit a large capacity of information in a wide coverage area at low cost.

Other Embodiments

The embodiments of the present invention have been described above. However, the present invention is not limited to these embodiments and various modifications and changes can be made within the spirit and scope of the present invention.

For example, in the above-described embodiments, an example in a case in which the antennas AN included in two active antennas, among the plurality of active antennas, arranged at adjacent positions in the array arrangement are coupled has been explained but the present invention is not limited to this. As long as a wiring is possible, two antennas AN included in two active antennas that are not adjacent to each other may be coupled. In the above example, an example in which the impedance variable device is coupled to a position that is not the end portion of the coupling line that connects the antennas and an example in which the impedance variable device is coupled not to the coupling line but to the antenna have been explained, but a combination of these may be possible. That is, the impedance variable device may be coupled to each of the antenna and the intermediate point of the coupling line that couples the antennas.

Furthermore, each of the above-described embodiments has explained the method of forming the antenna apparatus using a stacked structure but the present invention is not limited to this. That is, the above discussion can be applied to an antenna apparatus that uses no stacked structure. In this case, for example, the above-described semiconductor layer 100 can be replaced by a semiconductor structure or an arbitrary oscillation apparatus. By designing another structure in accordance with, for example, one of the circuit diagrams shown in FIGS. 5A to 5E and 6A to 6F, it is possible to obtain an antenna apparatus having the same performance as that of the antenna apparatus described in the embodiment.

Each of the above-described embodiments assumes that carriers are electrons. However, the present invention is not limited to this and holes may be used. Furthermore, the materials of the substrate and the dielectric are selected in accordance with an application purpose, and a semiconductor layer of silicon, gallium arsenide, indium arsenide, gallium phosphide, or the like, glass, ceramic, and a resin such as polytetrafluoroethylene or polyethylene terephthalate can be used.

In each of the above-described embodiments, a square patch antenna is used as a terahertz wave resonator but the shape of the resonator is not limited to this. For example, a resonator having a structure using a patch conductor having a polygonal shape such as a rectangular shape or triangular shape, a circular shape, an elliptical shape, or the like may be used.

The number of negative differential resistance elements integrated in an element is not limited to one and a resonator including a plurality of negative differential resistance elements may be used. The number of lines is not limited to one, and an arrangement including a plurality of lines may be used. By using the antenna apparatus described in each of the above embodiments, it is possible to oscillate and detect a terahertz wave.

In each of the above-described embodiments, a double-barrier RTD made of InGaAs/AlAs growing on the InP substrate has been described as an RTD. However, the present invention is not limited to the structure and material system, and even another combination of a structure and a material can provide an element of the present invention. For example, an RTD having a triple-barrier quantum well structure or an RTD having a multi-barrier quantum well structure of four or more barriers may be used.

As the material of the RTD, each of the following combinations may be used.

GaAs/AlGaAs, GaAs/AlAs, and InGaAs/GaAs/AlAs formed on a GaAs substrate

InGaAs/InAlAs, InGaAs/AlAs, and InGaAs/AlGaAsSb formed on an InP substrate

InAs/AlAsSb and InAs/AlSb formed on an InAs substrate

SiGe/SiGe formed on an Si substrate

The above-described structure and material can appropriately be selected in accordance with a desired frequency and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-067821, filed Apr. 15, 2022, which is hereby incorporated by reference herein in its entirety.

What is claimed is:

1. An antenna apparatus comprising:

an antenna array in which a plurality of active antennas each including an antenna and a semiconductor structure configured to generate or detect an electromagnetic wave are arranged in an array;

a first coupling line configured to mutually couple two antennas respectively included in at least two active antennas among the plurality of active antennas;

a second coupling line bonded to at least one antenna; and a first impedance variable device coupled to the first coupling line or the second coupling line, and configured to make an impedance of the first coupling line or an impedance of the second coupling line variable, wherein the second coupling line includes one end portion coupled to the antenna included in one active antenna among the plurality of active antennas and another end portion with an open end not coupled to any of the antennas of the active antennas, wherein the first impedance variable device is coupled to the open end of the second coupling line.

2. An antenna apparatus comprising:

an antenna array in which a plurality of active antennas each including an antenna and a semiconductor structure configured to generate or detect an electromagnetic wave are arranged in an array;

a first coupling line configured to mutually couple two antennas respectively included in at least two active antennas among the plurality of active antennas;

a second coupling line bonded to at least one antenna;

a first impedance variable device coupled to the second coupling line, and configured to make an impedance of the second coupling line variable; and a second impedance variable device coupled to the first coupling line and configured to make an impedance of the first coupling line variable, wherein the second impedance variable device is coupled to a position that is not an end portion of the first coupling line.

3. The apparatus according to claim 2, wherein for first the coupling line that couples the antennas respectively included in the at least two active antennas arranged adjacent to each other in the array arrangement among the plurality of active antennas, a length of a path in a case where the semiconductor structures respectively included in the at least two active antennas are connected via the first coupling line is set based on an electrical length of the electromagnetic wave in the first coupling line.

4. The apparatus according to claim 3, wherein for the first coupling line, the length of the path is set to be the electrical length of the electromagnetic wave which is equal to an integer multiple of $2\pi$.

5. The apparatus according to claim 2, wherein the position is set such that each of lengths between the position and the semiconductor structures respectively included in the at least two active antennas including the antennas coupled by the first coupling line is based on a wavelength of the electromagnetic wave in the first coupling line.

6. The apparatus according to claim 5, wherein the position corresponds to a position of a node of a standing wave of the electromagnetic wave in the first coupling line.

7. The apparatus according to claim 5, wherein the position corresponds to a position different from a node of a standing wave of the electromagnetic wave in the first coupling line.

8. The apparatus according to claim 2, wherein the first impedance variable device is coupled to each of the antennas respectively included in the plurality of active antennas.

9. The apparatus according to claim 2, wherein the first impedance variable device acts to adjust an electrical length of the electromagnetic wave in the second coupling line.

10. The apparatus according to claim 2, wherein the first impedance variable device includes a varactor diode.

11. The apparatus according to claim 2, wherein the first impedance variable device includes a transistor.

12. The apparatus according to claim 2, further comprising a first wiring configured to connect the semiconductor structure and a bias control unit configured to supply a bias signal to the semiconductor structure, and a second wiring configured to connect the first impedance variable device and a phase control unit configured to supply a control signal to the first impedance variable device, wherein the first wiring and the second wiring are individually controlled.

13. The apparatus according to claim 2, wherein in the antenna array, the plurality of active antennas are arranged in a matrix.

14. The apparatus according to claim 2, wherein in the antenna array, the plurality of active antennas are arranged at an interval not larger than a wavelength of the electromagnetic wave.

15. The apparatus according to claim 2, wherein in the antenna array, the plurality of active antennas are arranged at an interval that is equal to an integer multiple of a wavelength of the electromagnetic wave.

16. The apparatus according to claim 2, wherein the antenna is a patch antenna.

17. The apparatus according to claim 2, wherein the antenna is a slot antenna.

18. The apparatus according to claim 2, wherein the semiconductor structure includes a negative resistance element.

19. The apparatus according to claim 18, wherein the negative resistance element is a resonant tunneling diode.

20. The apparatus according to claim 2, wherein the second coupling line is capacitively coupled to the antenna.

21. The apparatus according to claim 2, wherein the second coupling line is directly coupled to the antenna.

22. The apparatus according to claim 2, wherein the electromagnetic wave is an electromagnetic wave in a terahertz band.

23. A communication apparatus comprising:

an antenna apparatus that comprises an antenna array in which a plurality of active antennas each including an antenna and a semiconductor structure configured to generate or detect an electromagnetic wave are arranged in an array, a first coupling line configured to mutually couple two antennas respectively included in at least two active antennas among the plurality of active antennas, a second coupling line bonded to at least one antenna, and a first impedance variable device coupled to the first coupling line or the second coupling line, and configured to make an impedance of the first coupling line or an impedance of the second coupling line variable;

a second impedance variable device coupled to the first coupling line and configured to make an impedance of the first coupling line variable, wherein the second impedance variable device is coupled to a position that is not an end portion of the first coupling line;

a transmission unit configured to emit the electromagnetic wave; and a reception unit configured to detect the electromagnetic wave.

24. An image capturing system comprising:

an antenna apparatus that comprises an antenna array in which a plurality of active antennas each including an antenna and a semiconductor structure configured to generate or detect an electromagnetic wave are arranged in an array, a first coupling line configured to mutually couple two antennas respectively included in at least two active antennas among the plurality of active antennas, a second coupling line bonded to at least one antenna, a first impedance variable device coupled to the second coupling line and configured to make an impedance of the second coupling line variable, and a second impedance variable device coupled to the first coupling line and configured to make an impedance of the first coupling line variable, wherein the second impedance variable device is coupled to a position that is not an end portion of the first coupling line;

a transmission unit configured to emit the electromagnetic wave to an object; and a detection unit configured to detect the electromagnetic wave reflected by the object.

25. A communication apparatus comprising:

an antenna apparatus that comprises an antenna array in which a plurality of active antennas each including an antenna and a semiconductor structure configured to generate or detect an electromagnetic wave are arranged in an array, a first coupling line configured to mutually couple two antennas respectively included in at least two active antennas among the plurality of active antennas, a second coupling line bonded to at least one antenna, wherein the second coupling line includes one end portion coupled to the antenna included in one active antenna among the plurality of active antennas and another end portion with an open end not coupled to any of the antennas of the active antennas, and a first impedance variable device coupled to the first coupling line or the second coupling line, and configured to make an impedance of the first coupling line or an impedance of the second coupling line variable, wherein the first impedance variable device is coupled to the open end of the second coupling line;

a transmission unit configured to emit the electromagnetic wave; and a reception unit configured to detect the electromagnetic wave.

26. An image capturing system comprising:

an antenna apparatus that comprises an antenna array in which a plurality of active antennas each including an antenna and a semiconductor structure configured to generate or detect an electromagnetic wave are arranged in an array, a first coupling line configured to mutually couple two antennas respectively included in at least two active antennas among the plurality of active antennas, a second coupling line bonded to at least one antenna, wherein the second coupling line includes one end portion coupled to the antenna included in one active antenna among the plurality of active antennas and another end portion with an open end not coupled to any of the antennas of the active antennas, and a first impedance variable device coupled to the first coupling line or the second coupling line, and configured to make an impedance of the first coupling line or an impedance of the second coupling line variable, wherein the first impedance variable device is coupled to the open end of the second coupling line;

a transmission unit configured to emit the electromagnetic wave to an object; and a detection unit configured to detect the electromagnetic wave reflected by the object.

* * * * *